US012009161B2

(12) United States Patent
Hsieh et al.

(10) Patent No.: US 12,009,161 B2
(45) Date of Patent: Jun. 11, 2024

(54) KEY STRUCTURE

(71) Applicant: Darfon Electronics Corp., Taoyuan (TW)

(72) Inventors: Yu-Chun Hsieh, Taoyuan (TW); Ling-Hsi Chao, Taoyuan (TW); Shao-Lun Hsiao, Taoyuan (TW); Chen Yang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/841,801

(22) Filed: Jun. 16, 2022

(65) Prior Publication Data

US 2022/0406540 A1 Dec. 22, 2022

(30) Foreign Application Priority Data

Jun. 18, 2021 (TW) ................................ 110122444

(51) Int. Cl.
*H01H 13/20* (2006.01)
*H01H 13/10* (2006.01)
*H01H 13/14* (2006.01)

(52) U.S. Cl.
CPC ............ *H01H 13/20* (2013.01); *H01H 13/10* (2013.01); *H01H 13/14* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 4,265,557 A * | 5/1981 | Runge | B41J 5/10 | 400/489 |
| 7,442,894 B2 | 10/2008 | Villain et al. | | |
| 10,259,384 B2 | 4/2019 | Teng et al. | | |
| 10,515,508 B2 | 12/2019 | Brandau | | |
| 2013/0126323 A1* | 5/2013 | Hsu | H01H 13/02 | 200/341 |
| 2016/0351349 A1 | 12/2016 | Chen et al. | | |
| 2019/0206634 A1* | 7/2019 | Chang | H01H 13/12 | |
| 2019/0238131 A1* | 8/2019 | Yang | H03K 17/969 | |

FOREIGN PATENT DOCUMENTS

| | | |
|---|---|---|
| CN | 101320646 A | 12/2008 |
| CN | 100530061 C | 8/2009 |
| CN | 101025668 B | 8/2010 |

(Continued)

*Primary Examiner* — Ahmed M Saeed
(74) *Attorney, Agent, or Firm* — McClure, Qualey & Rodack, LLP

(57) ABSTRACT

A key structure includes a base and a linkage mechanism. The linkage mechanism includes a plurality of linking members movably connected to each other. The plurality of linking members includes at least two linking members rotatably positioned on the base, respectively. When a pressing force is applied to the linkage mechanism, the plurality of linking members move associated with each other to restrict a rotation range of the plurality of linking members with respect to the base.

14 Claims, 29 Drawing Sheets

(56) References Cited

FOREIGN PATENT DOCUMENTS

| | | | |
|---|---|---|---|
| CN | 104576141 | A | 4/2015 |
| CN | 104681337 | A | 6/2015 |
| CN | 104599884 | B | 11/2016 |
| CN | 106648177 | A | 5/2017 |
| CN | 209015959 | U | 6/2019 |
| CN | 209282108 | U | 8/2019 |
| CN | 113053686 | A | 6/2021 |
| EP | 0693761 | A1 | 1/1996 |
| TW | 201624203 | A | 7/2016 |
| TW | 201801115 | A | 1/2018 |
| TW | 201802643 | A | 1/2018 |
| TW | 201905650 | A | 2/2019 |
| TW | 202004804 | A | 1/2020 |
| TW | 202009961 | A | 3/2020 |
| TW | I687849 | B | 3/2020 |
| TW | I699799 | B | 7/2020 |
| WO | 2020261664 | A1 | 12/2020 |

* cited by examiner

1C'

KEY STRUCTURE

BACKGROUND OF THE INVENTION

1. Field of the Invention

The invention generally relates to a key structure. Particularly, the invention relates to a silent key structure.

2. Description of the Prior Art

The tactile feedbacks of a keyswitch generally include a click tactile feedback or a linear feedback. In addition to the tactile feedback, the sound of the keyswitch is also an important factor affecting the user's operating experience. At present, the demand for silent keyswitch on the market is often not satisfied. One of the reasons is that the silencing effect of the plunger is not good, and the click feedback of the keyswitch is often compromised to achieve silent operation because the keyswitch is easy to generate sound if the click feedback is desired.

Moreover, current silencing designs of the keyswitch mostly utilize cushion materials (e.g. soft materials), which achieve the silencing effect by using the cushion materials as a contact stopper. However, even if the cushion materials are used, sound is still generated due to contact or collision.

SUMMARY OF THE INVENTION

It is an object of the invention to provide a key structure, which reduces the sound caused by collision and enhances the silencing effect through the pressing stop point achieved by the linkage limitation.

It is another object of the invention to provide a key structure, which provides the keystroke feedback through the linkage mechanism to enhance the user's operation experience.

It is a further object of the invention to provide a key structure, which reduces the sound caused by collision to enhance the silencing effect and provides the click feedback through the magnetic unit.

In an embodiment, the invention provides a key structure including a base and a linkage mechanism. The linkage mechanism includes a plurality of linking members movably connected to each other, and the plurality of linking members include at least two linking members rotatably positioned on the base, respectively. When a pressing force is applied to the linkage mechanism, the plurality of linking members move associated with each other to restrict a rotation range of the plurality of linking members with respect to the base.

In an embodiment, the plurality of linking members includes a first linking member and a second linking member. The first linking member has a first pivoting portion, and the first linking member couples with the base through the first pivoting portion to form a first rotation axis. The second linking member has a second pivoting portion, and the second linking member couples with the base through the second pivoting portion to form a second rotation axis. The first linking member couples with the second linking member to form a coupling axis. When the pressing force is applied to the linkage mechanism, the first linking member rotates about the first rotation axis along a first direction to drive the coupling axis to move relative to the base, so the second linking member is driven to rotate about the second rotation axis along a second direction. The first direction and the second direction are a same direction or different directions.

In an embodiment, the first linking member has a first connecting portion connected to the first pivoting portion and located at one side of the first linking member. The second linking member has a second connecting portion connected to the second pivoting portion and located at one side of the second linking member. The first connecting portion and the second connecting portion couple with each other to form the coupling axis.

In an embodiment, the first connecting portion includes two first connection sections disposed at two opposite ends of the first pivoting portion along the first rotation axis. The second connecting portion includes two second connection sections disposed at two opposite ends of the second pivoting portion along the second rotation axis to couple with the two first connection sections, respectively. When the first linking member drives the second linking member to move, at least one of the first connection section and the second connection section elastically deforms.

In an embodiment, the second linking member further has a tactile feedback portion connected to the second pivoting portion and movably coupling the first pivoting portion. When the first linking member drives the second linking member to move, the tactile feedback portion moves relative to the first pivoting portion.

In an embodiment, the tactile feedback portion has a protrusion disposed corresponding to the first pivoting portion. When the tactile feedback portion moves relative to the first pivoting portion, the protrusion interferes with the first pivoting portion.

In an embodiment, the tactile feedback portion is formed with a groove. The protrusion is disposed at one side of the groove corresponding to the first pivoting portion. When the tactile feedback portion moves relative to the first pivoting portion, the first pivoting portion moves from one end of the groove to the other end of the groove and interacts with the protrusion during movement.

In an embodiment, the key structure further includes a restoring member disposed on the base. When the pressing force is released, the restoring member provides a restoring force to enable the plurality of linking members to return to a non-pressed position.

In an embodiment, the restoring member includes a resilient member. The resilient member includes a positioning portion positioned on the base and an acting portion extending corresponding to one of the plurality of linking members. When the pressing force is applied to the linkage mechanism, the linkage mechanism pushes the acting portion to move relative to the positioning portion.

In an embodiment, the key structure further includes a magnetic unit. The magnetic unit includes a first magnetic member disposed on the linkage mechanism and a second magnetic member disposed corresponding to the first magnetic member to generate a magnetic attraction force. When the pressing force is applied to the linkage mechanism, the linkage mechanism drives the first magnetic member to move away from the second magnetic member. When the pressing force is released, the magnetic attraction force enables the linkage mechanism to move with the first magnetic member toward the second magnetic member to a position before the pressing force is applied.

In an embodiment, the key structure further includes a switch unit disposed corresponding to the linkage mechanism. When the pressing force is applied to the linkage mechanism, the linkage mechanism moves relative to the base to trigger the switch unit.

In an embodiment, the base has a light channel. The switch unit includes an emitter and a receiver disposed at two ends of the light channel, respectively. When the linkage mechanism moves relative to the base, the linkage mechanism changes an intensity of an optical signal received by the receiver from the emitter to trigger the switch unit.

In another embodiment, the invention provides a key structure including a base, a movable member rotatably disposed on the base, and a magnetic unit including a first magnetic member and a second magnetic member. The first magnetic member is disposed on the movable member, and the second magnetic member is disposed corresponding to the first magnetic member to generate a magnetic attraction force. When a pressing force is applied to the movable member, the movable member drives the first magnetic member to move away from the second magnetic member. When the pressing force is released, the magnetic attraction force enables the movable member to move with the first magnetic member toward the second magnetic member to a position before the pressing force is applied.

In an embodiment, the magnetic unit further includes a third magnetic member. The third magnetic member and the second magnetic member are disposed along a moving path of the movable member. When the pressing force is applied to the movable member, the movable member drives the first magnetic member to move away from the second magnetic member and close to the third magnetic member.

In an embodiment, the key structure further includes a restoring member disposed on the base. When the pressing force is released, the restoring member provides a restoring force to enable the movable member to move with the first magnetic member to a position before the pressing force is applied.

In an embodiment, the key structure further includes a switch unit. The base has a light channel, and the switch unit includes an emitter and a receiver disposed at two ends of the light channel, respectively. When the movable member moves relative to the base, the movable member changes an intensity of an optical signal received by the receiver from the emitter to trigger the switch unit.

Compared with the prior art, the key structure of the invention utilizes the linkage mechanism or the magnetic unit to provide the displacement limitation, so as to reduce the sound caused by collision during movement of components of the key structure. Moreover, the key structure of the invention can provide a silent click feedback through the linkage mechanism or the magnetic unit to promote the operation experience.

BRIEF DESCRIPTION OF THE DRAWINGS

FIG. 2A to FIG. 2C are operation views of the key structure of FIG. 1C, wherein FIG. 2A to FIG. 2C show that the key structure are in the non-pressed state, the transition state, and the pressing stop state, respectively.

FIG. 5A to FIG. 5C are operation views of the key structure of FIG. 4C, wherein FIG. 5A to FIG. 5C show that the key structure are in the non-pressed state, the transition state, and the pressing stop state, respectively.

FIG. 7A and FIG. 7B are operation views of the key structure of FIG. 6B, wherein FIG. 7A and FIG. 7B show that the key structure are in the non-pressed state and the pressing stop state, respectively.

FIG. 9A to FIG. 9C are operation views of the key structure of FIG. 8B, wherein FIG. 9A to FIG. 9C show that the key structure are in the non-pressed state, the transition state, and the pressing stop state, respectively.

FIG. 11A and FIG. 11B are variant operation views of the key structure of FIG. 8B, wherein FIG. 11A and FIG. 11B show that the key structure are in the non-pressed state and the pressing stop state, respectively.

FIG. 13A and FIG. 13B are operation views of the key structure of FIG. 12B, wherein FIG. 13A and FIG. 13B show that the key structure are in the non-pressed state and the pressing stop state, respectively.

FIG. 15A and FIG. 15B are operation views of the key structure of FIG. 14, wherein FIG. 15A and FIG. 15B show that the key structure are in the non-pressed state and the pressing stop state, respectively.

FIG. 17A and FIG. 17B are operation views of the key structure of FIG. 16B, wherein FIG. 17A and FIG. 17B show that the key structure are in the non-pressed state and the pressing stop state, respectively.

DETAILED DESCRIPTION OF THE PREFERRED EMBODIMENT

The invention provides a key structure, which can be applied to any pressing type input device (e.g. mouse, keyboard) or integrated to any suitable electronic devices (e.g. keybuttons or keyboard equipped in portable devices), to reduce the abnormal sound generated during pressing operation and to provide the click feedback of the pressing operation. Hereinafter, the structure and operation of the key structure of the invention will be described in detail with reference to the drawings.

Figure 1A:
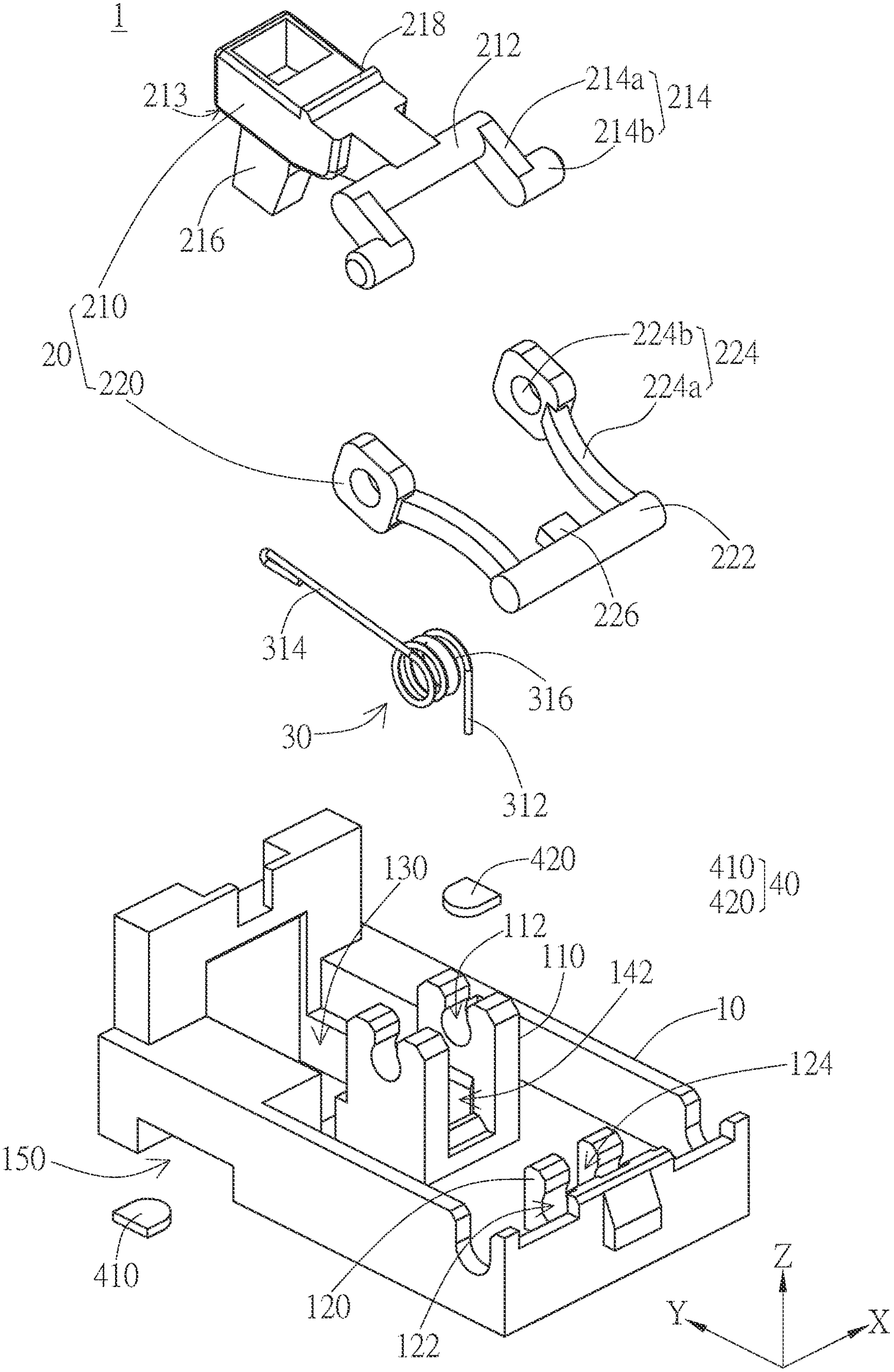
FIG. 1A to FIG. 1C are an exploded view, a partially exploded view, and an assembled view of the key structure in a first embodiment of the invention, respectively.
Figure 1B:
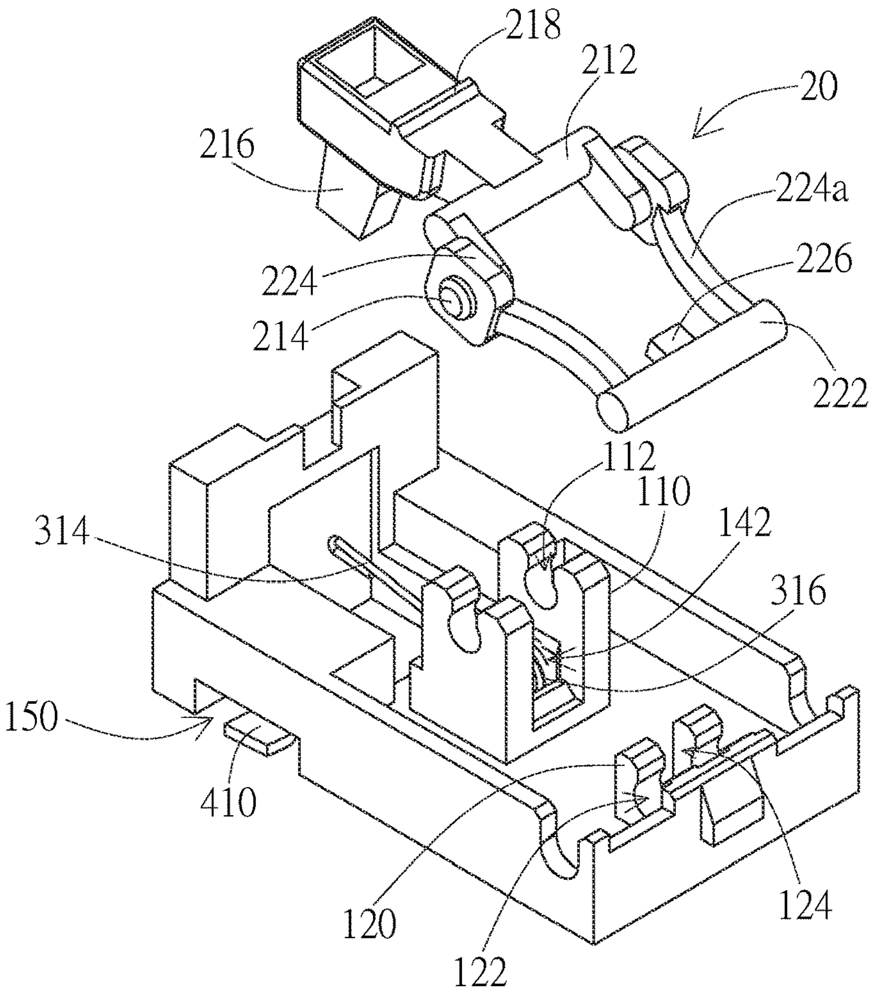
Figure 1C:
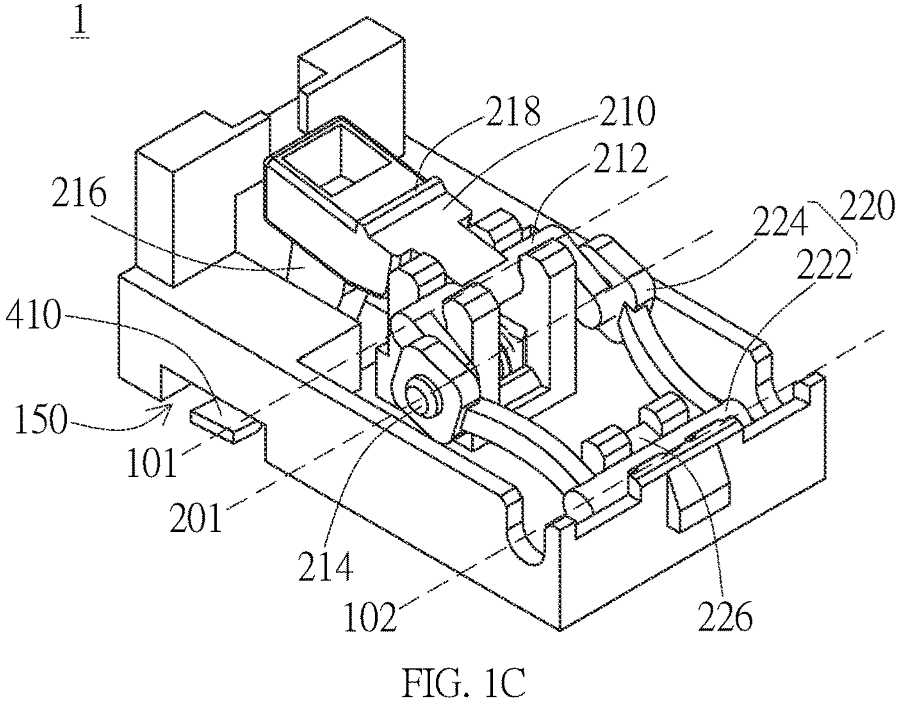

FIG. 1A to FIG. 1C are an exploded view, a partially exploded view, and an assembled view of the key structure 1 in a first embodiment of the invention, respectively. As shown in FIG. 1A to FIG. 1C, in this embodiment, the key structure 1 includes a base 10 and a linkage mechanism 20. The linkage mechanism 20 includes a plurality of linking members, and the plurality of linking members are rotatably connected to each other. The plurality of linking members includes at least two linking members (e.g. a first linking member 210 and a second linking member 220), which are rotatably positioned on the base 10, respectively. When a pressing force is applied to the linkage mechanism 20 (e.g. to the first linking member 210), the plurality of linking members move associated with each other to restrict a rotation range of the plurality of linking members with respect to the base 10.

Specifically, the base 10 is a component adapted to position the linkage mechanism 20 and has a structure for coupling the plurality of linking members, so at least two linking members of the plurality of linking members can be rotatably positioned on the base 10. As shown in the drawings, the base 10 has a first coupling portion 110 and a second coupling portion 120. The first linking member 210 and the second linking member 220 rotatably couple with the first coupling portion 110 and the second coupling portion 120, respectively. For example, the base 10 and the linking member (e.g. first linking member 210, second linking member 220) can rotatably couple with each other through the coupling mechanism of a pivot and a pivotal hole. In other words, one of the base 10 and the linking member (e.g. 210, 220) has a pivot structure, and the other of the base 10 and the linking member (e.g. 210, 220) has a corresponding pivotal hole, so the base 10 and the linking member can rotatably couple with each other. In this embodiment, each of the first coupling portion 120 and the second coupling portion 120 has a coupling hole structure, such as holes 112, 122, and the linking member (e.g. each of the first linking member 210 and the second linking member 220) has a corresponding pivot structure, but not limited thereto. In other embodiments, according to practical applications, the locations of the pivotal hole and the pivot can be interchanged. For example, each of the first coupling portion 120 and the second coupling portion 120 can have a pivot structure, and the linking member (e.g. each of the first linking member 210 and the second linking member 220) has a corresponding pivotal hole structure. In this embodiment, the first coupling portion 110 and the second coupling portion 120 are arranged along the Y-axis direction and apart from each other. The first coupling portion 110 includes two pivotal holes 112, which are arranged along the X-axis direction and apart from each other, so an accommodation space 142 is defined between the two pivotal holes 112 of the first coupling portion 110. The second coupling portion 120 includes two pivotal holes 122, which are arranged along the X-axis direction and apart from each other, so a positioning space 124 is defined between the two pivotal holes 122 of the second coupling portion 120. The height of the first coupling portion 110 extending upward from the bottom of the base 10 (i.e., the distance between the pivotal hole 112 and the bottom of the base 10) is larger than the height of the second coupling portion 120 extending upward from the bottom of the base 10 (i.e., the distance between the pivotal hole 122 and the bottom of the base 10). In other words, in the Z-axis direction, the height of the first coupling portion 110 is larger than the height of the second coupling portion 120. Moreover, the bottom of the base 10 can be formed with an opening 130, which is adapted to allow a portion of the linkage mechanism 20 (e.g. the first linking member 210) to extend thereinto. The base 10 can further include a positioning mechanism, which is disposed corresponding to a restoring member 30 (described later). The positioning mechanism can be the accommodation space 142, a positioning hole 144 (shown in FIG. 2A), which is adapted to accommodate or position the restoring member 30.

Figure 12A:
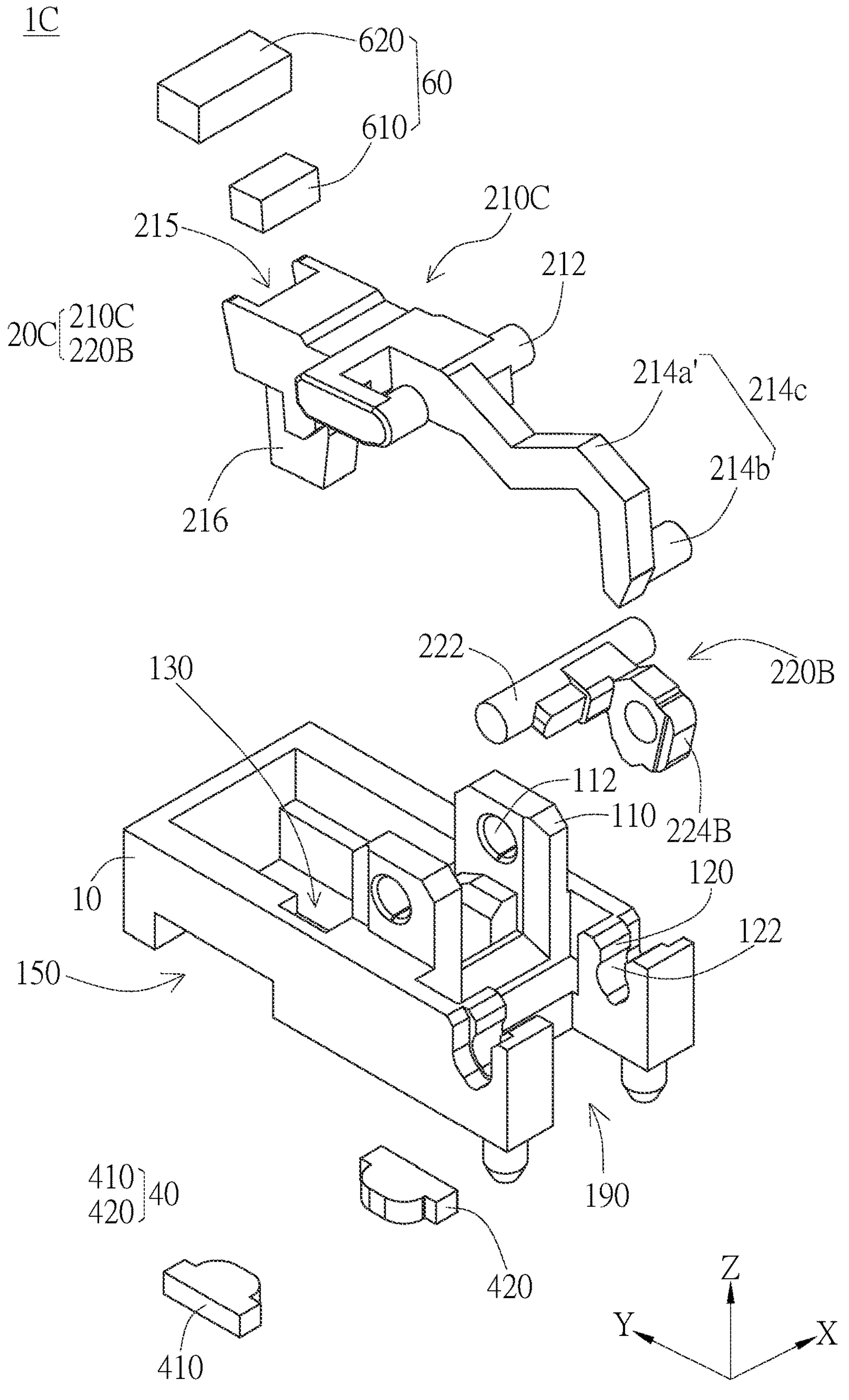
FIG. 12A and FIG. 12B are an exploded view and an assembled view of the key structure in a sixth embodiment of the invention.

In this embodiment, the plurality of linking members of the linkage mechanism 20 can include the first linking member 210 and the second linking member 220, and the first linking member 210 and the second linking member 220 are rotatably positioned on the base 10, respectively, but not limited thereto. In other embodiments, the linkage mechanism 20 can include two or more linking members, and at least two linking members of the plurality of linking members are rotatably positioned on the base 10. As such, in response to the pressing force, the plurality of linking members can move associated with each other to restrict the moving range or the rotation range of the plurality of linking members relative to the base 10. For example, corresponding to the first coupling portion 110 and the second coupling portion 120 of the base 10, the first linking member 210 can have a first pivoting portion 212, and the second linking member 220 can have a second pivoting portion 222. The first linking member 210 couples with the base 10 (e.g. the first coupling portion 110) through the first pivoting portion 212 to form a first rotation axis 101, and the second linking member 220 couples with the base 10 (e.g. the second coupling portion 120) through the second pivoting portion 212 to form a second rotation axis 102. As such, the first linking member 210 and the second linking member 220 are rotatably positioned on or engage with the base 10 and rotate about the first rotation axis 101 and the second rotation axis 102, respectively. As described above, in the Z-axis direction, the height of the first coupling portion 110 is larger than the height of the second coupling portion 120, so the first rotation axis 101 is higher than the second rotation axis 102 in Z-axis direction. Moreover, in this embodiment, adjacent ends of the first linking member 210 and the second linking member 220 couple with each other to form a coupling axis 201, so the first linking member 210 can drive the second linking member 220 to move. In the connection direction of the first linking member 210 and the second linking member 220 (e.g. the Y-axis direction), the coupling axis 201 is located between the first rotation axis 101 and the second rotation axis 102, so when the first linking member 210 moves (or rotates) with respect to the base 10, the first linking member 210 can drive the second linking member 220 to move (or rotate) in an opposite direction with respect to the base 10, and in response to the rotations of the first linking member 210 and the second linking member 220, the coupling axis 201 can move relative to the base 10 (in the up-down direction), but not limited thereto. According to practical applications, the coupling position of the two linking members can be modified, so the two linking members can move (or rotate) in the same direction with respect to the base 10 (as shown in the embodiment of FIG. 12A). In addition, the coupling position (e.g. the coupling axis 201) of the linking members are not limited to be between the two rotation axes (e.g. the first rotation axis 101 and the second rotation axis 102) (as shown in the embodiment of FIG. 12A). Moreover, according to the pressing position (i.e., where the pressing force is applied), the coupling axis 201 can move toward the base 10 or away from the base 10 after the linkage mechanism is pressed.

Specifically, the first linking member 210 includes a first connecting portion 214, and the second linking member 220 includes a second connecting portion 224. The first linking member 210 and the second linking member 220 movably couple with each other through the first connecting portion 214 and the second connecting portion 224 to form the linkage mechanism 20. For example, the first connecting portion 214 and the second connecting portion 224 are adjacent ends of the first linking member 210 and the second linking member 220. The first linking member 210 and the second linking member 220 can movably couple with each other through the coupling mechanism of pivot and pivotal hole. In other words, one of the first linking member 210 and the second linking member 220 has a pivot structure, and the other of the first linking member 210 and the second linking member 220 has a corresponding pivotal hole structure, so two adjacent ends of the first linking member 210 and the second linking member 220 can movably couple with each other. In this embodiment, the first connecting portion 214 has a pivot, and the second connecting portion 224 has a corresponding pivotal hole, so the first connecting portion 214 and the second connecting portion 224 couple with each other to form the coupling axis 201, but not limited thereto. In other embodiments, according to practical applications, the locations of the pivot and the pivotal hole can be interchanged. For example, the first connecting portion 214 can have a pivotal hole, and the second connecting portion 224 has a corresponding pivot.

As shown in FIG. 1A to FIG. 1C, the first connecting portion 214 of the first linking member 210 is connected to the first pivoting portion 212 and located at one side of the first linking member 210 (e.g. righthand side). The second connecting portion 224 of the second linking member 220 is connected to the second pivoting portion 222 and located at one side of the second linking member 220 (e.g. lefthand side), so the second connecting portion 224 is adjacent to the first connecting portion 214 of the first linking member 210. In other words, the first linking member 210 and the second linking member 220 couple with each other through the first connecting portion 214 and the second connecting portion 224, which are adjacent to each other and movably couple with each other. Specifically, the first pivoting portion 212 of the first linking member 210 is a pivot shaft disposed along the X-axis direction, and the first connecting portion 214 includes a first connection section 214*a* and a pivot 214*b*. For example, two first connection sections 214*a* are preferably disposed along the X-axis direction at two opposite ends of the first pivoting portion 212, i.e., the two first connection sections 214*a* are disposed along the first rotation axis 101 and apart from each other. The two first connection sections 214*a* extend from the first pivoting portion 212 along the Y-axis direction by a predetermined distance. The pivot 214*b* is disposed on the distal end of each first connection section 214*a* and away from the first pivoting portion 212. In this embodiment, the two pivots 214*b* extend toward the outer side of the first connection sections 214*a* along the X-axis direction, so the two pivot 214*b* extend away from each other, but not limited thereto. According to practical applications, the two pivots 214*a* can extend toward the inner side of the first connection sections 214*a* along the X-axis direction, so the two pivots 214*b* extend toward each other. In another embodiment, the two pivots 214*b* can extend toward the inner side and the outer side along the X-axis direction, respectively, so the two pivots 214*b* extend toward the same direction. In an embodiment, the first connecting portion 214 preferably extends inclinedly outward with respect to the first pivoting portion 212. For example, the two first connection sections 214*a* of the first connecting portion 214 extend downward from the first pivoting portion 212 and are inclined outward with respect to the Y-axis direction, so the extending directions of the first connecting portion 214 and the first pivoting portion 212 are not coplanar.

The first linking member 210 can be an actuating linking member, which receives the pressing force to trigger the switch unit (e.g. 40). Specifically, the first linking member 210 can include an actuating portion 216, and when the first linking member 210 rotates with respect to the base 10, the actuating portion 216 moves to trigger the switch unit. For example, the actuating portion 216 can be disposed on another side of the first pivoting portion 212 opposite to the first connecting portion 214. The actuating portion 216 preferably extends downward with respect to the first pivoting portion 212. In other words, the actuating portion 216 and the first connecting portion 214 are located at two opposite sides of the first pivoting portion 212 in the Y-axis direction. The actuating portion 216, the first pivoting portion 212, and the first connecting portion 214 are sequentially disposed along the Y-axis direction. When the first linking member 210 rotates about the first rotation axis 101 formed by the first pivoting portion 212, the actuating portion 216 and the first connecting portion 214 move in opposite directions with respect to the base 10. For example, with respect to the first pivoting portion 212, when the pressing force is applied to the side of the first linking member 210 having the actuating portion 216 disposed thereon, the actuating portion 216 moves downward toward the base 10, and the first connecting portion 214 moves upward away from the base 10. The first linking member 210 can optionally include a positioning portion 218 to define the position to which the pressing force is applied. In this embodiment, the positioning portion 218 can be a rib or bump, which protrudes from the upper surface of the first linking member 210. There is a predetermined distance between the positioning portion 218 and the first pivoting portion 212 to define the position of the force-applying operation member 50 (shown in FIG. 2A), but not limited thereto. In other embodiments (not shown), the positioning portion 218 can be implemented as a groove on the first linking member 210, so the operation member 50 can be positioned in the groove.

Corresponding to the shape of the first connecting portion 214 of the first linking member 210, the second linking member 220 can include two second connection sections 224*a* and two pivotal holes 224*b*. For example, the two second connection sections 224*a* disposed along the X-axis direction at two opposite ends of the second pivoting portion 222, i.e., the two second connection sections 224*a* are disposed along the second rotation axis 102 and apart from each other. The two second connection sections 224*a* extend from the second pivoting portion 222 along the Y-axis direction by a predetermined distance. The pivotal holes 224*b* is disposed on the distal end of each second connection section 224*a* and away from the second pivoting portion 222. The two pivotal holes 224*b* are preferably aligned with each other along the X-axis direction. By inserting the pivots 214*b* into the corresponding pivotal holes 224*b*, the two second connection sections 224*a* respectively couple the two first connection sections 214*a*, so the first connecting portion 214 is movably connected to the second connecting portion 224. In this embodiment, the second connection sections 224*a* preferably have a curved shape. When the first linking member 210 drives the second linking member 220 to move, the second connection sections 224*a* can elastically deform. Moreover, the second linking member 220 can optionally have a restricting portion 226, and the restricting portion 226 can be a protrusion or a bump protruding from the second pivoting portion 222. For example, the restricting portion 226 can be located between the two second connection sections 224*a* and protrudes from the second pivoting portion 222 corresponding to the positioning space 124 of the base 10.

The key structure 1 can further include a restoring member 30 and a switch unit 40. The restoring member 30 is adapted to provide a restoring force to enable the linkage mechanism 20 to return to the non-pressed position, and the switch unit 40 is adapted to be triggered to generate the triggering signal. The restoring member 30 is disposed on the base 10. When the pressing force is released, the restoring member 30 provides the restoring force, so the plurality of linking members (e.g. the first linking member 210 and the second linking member 220) are moved associated with each other back to the position before the pressing force is applied (i.e., the non-pressed position). In an embodiment, the restoring member 30 can be implemented as a resilient member having a positioning portion 312 and an acting portion 314. The positioning portion 312 is positioned on the base 10, and the acting portion 314 extends corresponding to one of the plurality of linking members (e.g. the first linking member 210). For example, the restoring member 30 can be implemented as a torsion spring. One end of the torsion spring functions as the positioning portion 312, and the other end of the torsion spring functions as the acting portion 314. In other words, the positioning portion 312 and the acting portion 314 are two rods extending out from two opposite ends of the spring body 316. The acting portion 314 preferably extends toward a direction away from the first connecting portion 214, so the acting portion 314 can come into contact to the side of the first linking member 210 having the actuating portion 216 disposed thereon. For example, the acting portion 314 touches against the lower surface 213 of the first linking member 210, and the actuating portion 216 extends downward from the lower surface 213. When the pressing force is applied to the first linking member 210, the first linking member 210 (e.g. by the lower surface 213) pushes the acting portion 314 to drive the acting portion 314 to move relative to the positioning portion 312.

In an embodiment, the switch unit 40 can be implemented as an optical switch, and the switch unit 40 is disposed corresponding to the linkage mechanism 20 (e.g. the first linking member 210). When the pressing force is applied to the linkage mechanism 20 (e.g. the first linking member 210), the first linking member 210 moves relative to the base 10 to trigger the switch unit 40. Specifically, the switch unit 40 includes an emitter 410 and a receiver 420. The emitter 410 and the receiver 420 are electrically connected to a circuit board (not shown). When the first linking member 210 moves relative to the base 10, the intensity of the optical signal received by the receiver 420 from the emitter 410 is changed to generate the triggering signal. Corresponding to the optical type switch unit 40, the base 10 preferably has a light channel 150, so the emitter 410 and the receiver 420 can be disposed at two opposite sides of the light channel 150. The extending direction of the light channel 150 (e.g. the X-axis direction) preferably intersects with the connecting direction of the first pivoting portion 212 and the first connecting portion 214 (e.g. the Y-axis direction), so when the actuating portion 216 moves in response to the movement of the first linking member 210, the actuating portion 216 selectively shields the light channel 150 to change the intensity of the optical signal received by the receiver 420 from the emitter 410 to trigger the switch unit 40. It is noted that the key structure 1 is illustrated with the optical type switch unit 40, but not limited thereto. In other embodiments, the key structure 1 can have other types of switch unit, which generates the triggering signal in response to the movement of the first linking member 210 (e.g. the actuating portion 216). For example, according to practical applications, the switch unit can include an electrode module, a switch membrane, a microswitch, a magnetic type switch (Hall effect switch), or the like, which is triggered in response to the movement of the first linking member 210 (e.g. actuating portion 216). In this embodiment, the switch unit 40 is triggered by the actuating portion 216 of the first linking member 210, but not limited thereto. In other embodiments, according to practical applications, the switch unit 40 can be triggered by other components, such as a component which is affected by the movement of the first linking member 210 to change the status of the switch unit 40 (e.g. as the embodiment shown in FIG. 14).

As shown in FIG. 1A to FIG. 1C and FIG. 2A, when the key structure 1 is assembled, the positioning portion 312 of the restoring member 30 is inserted into the positioning hole 144 of the base 10. The spring body 316 is disposed in the accommodation space 142, which is located between the two pivotal holes 112 of the first coupling portion 110 of the base 10, so the spring body 316 is located under the first pivoting portion 212 of the first linking member 210, and the acting portion 314 extends toward a direction away from the first connecting portion 214 to be in contact with the lower surface 213 of the first linking member 210. The first connecting portion 214 of the first linking member 210 and the second connecting portion 224 of the second linking member 220 are rotatably connected (i.e., the pivot 214*b* and the pivotal hole 224*b* are pivotally connected) to form the coupling axis 201. The first pivoting portion 212 of the first linking member 210 is rotatably connected to the pivotal holes 112 of the first coupling portion 110 of the base 10 to form the first rotation axis 101, so the actuating portion 216 of the first linking member 210 is disposed corresponding to the opening 130. The second pivoting portion 222 of the second linking member 220 is rotatably connected to the pivotal holes 122 of the second coupling portion 120 of the base 10 to form the second rotation axis 102, and the restricting portion 226 of the second linking member 220 is located in the positioning space 124 between the two pivotal holes 122 of the second coupling portion 120 of the base 10 to limit the lateral movement of the second linking member 220 (e.g. the movement in the X-axis direction).

Figure 2A:
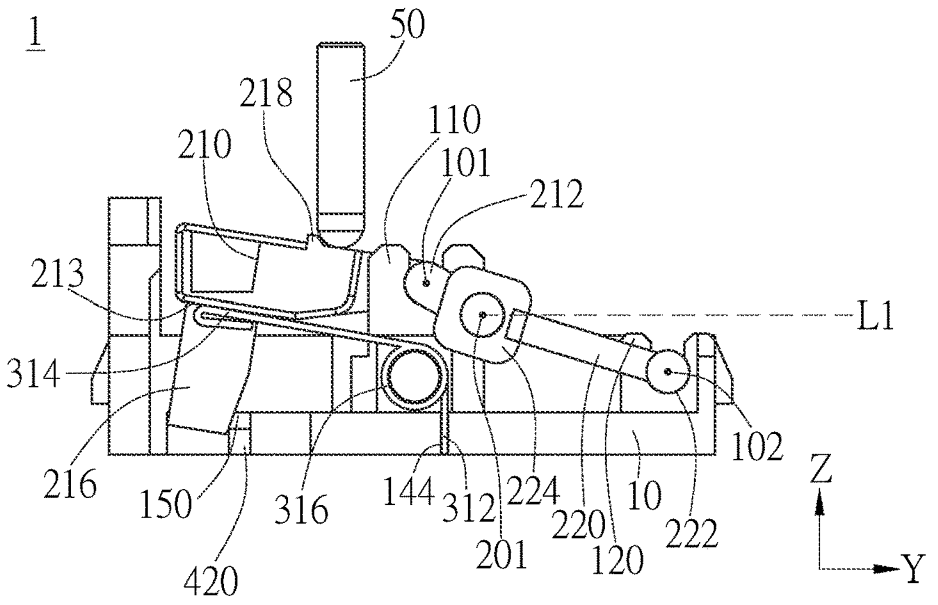
Figure 2B:
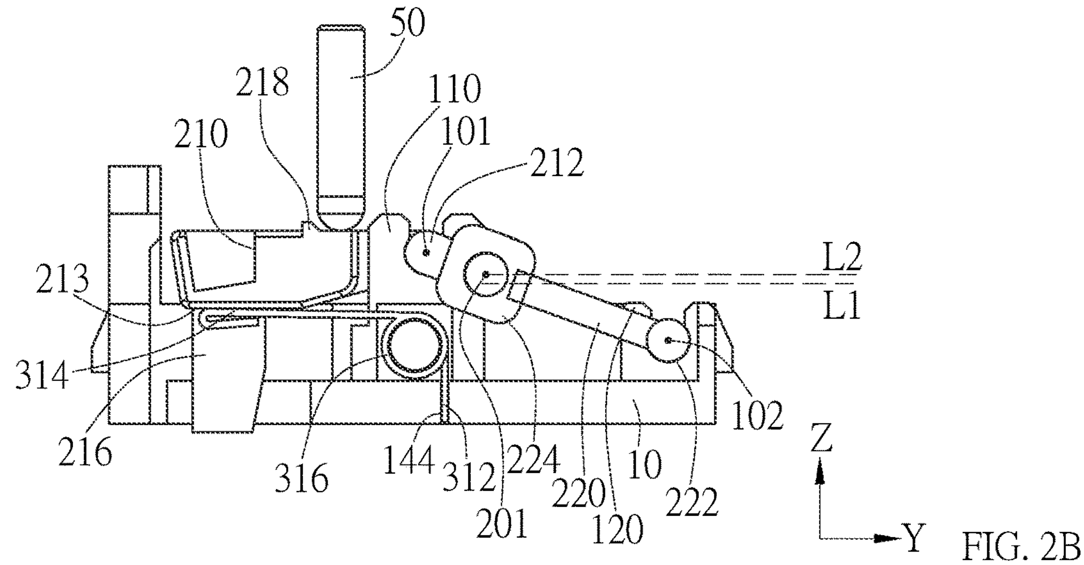
Figure 2C:
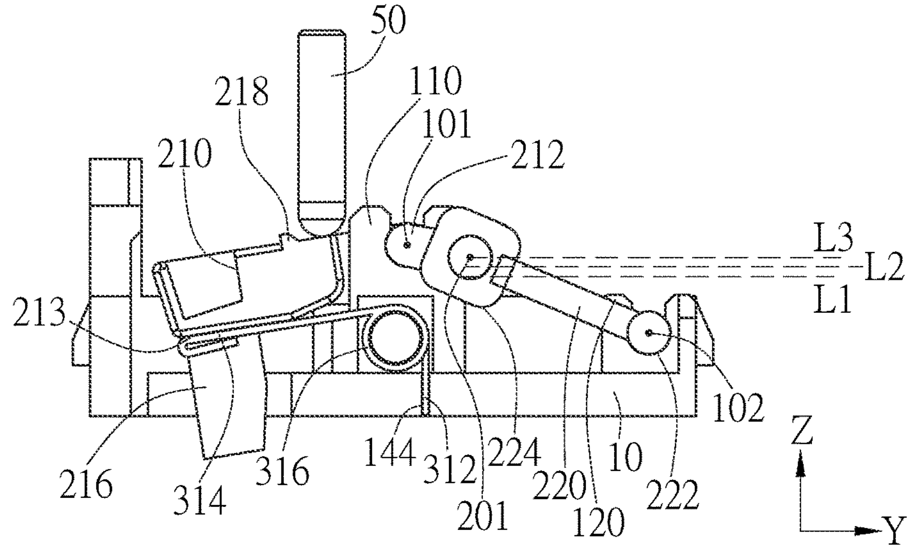

Referring to FIG. 2A to FIG. 2C, the operation of the key structure 1 is illustrated. FIG. 2A to FIG. 2C show that the key structure 1 is in the non-pressed state, the transition state, and the pressing stop state, respectively. As shown in FIG. 2A, when the pressing force is not applied to the linkage mechanism 20 (e.g. the first linking member 210), the linkage mechanism 20 supports the key structure 1 in the non-pressed state by the restoring force provided by the restoring member 30. When the key structure 1 is in the non-pressed state, the coupling axis 201 of the first linking member 210 and the second linking member 220 formed by coupling the first connecting portion 214 and the second connecting portion 224 is located at the non-pressed position L1. The operation member 50 is positioned by the positioning portion 218 of the first linking member 210, and the actuating portion 216 of the first linking member 210 does not shield or partially shields the light channel 150, so the intensity of the optical signal received by the receiver 420 from the emitter 410 is stronger (i.e., the amount of light received is larger).

As shown in FIG. 2B, when the pressing force is applied to the first linking member 210 of the linkage mechanism 20 by the operation member 50, the first linking member 210 rotates about the first rotation axis 101 along a first direction (e.g. counterclockwise) to drive the coupling axis 201 to move relative to the base 10, so the second linking member 220 is driven to rotate about the second rotation axis 102 along a second direction (e.g. clockwise). Specifically, when the first linking member 210 rotates about the first rotation axis 101 to drive the actuating portion 216 to rotate counterclockwise toward the base 10, the lower surface 213 of the first linking member 210 pushes the acting portion 314 of the restoring member 30, so the acting portion 314 moves downward relative to the positioning portion 312, and the acting portion 314 is elastically deformed with respect to the positioning portion 312. The actuating portion 216 rotates with the first linking member 210 to a position that the light channel 150 can be shielded. As such, the intensity of the optical signal received by the receiver 420 from the emitter 410 is smaller (e.g. the amount of light received is less) or substantially equal to zero (i.e., the receiver 420 does not receive the optical signal), and the switch unit 40 is triggered to generate the triggering signal. Meanwhile, the first connecting portion 214 of the first linking member 210 rotates counterclockwise away from the base 10 (i.e., the coupling axis 201 moves upward to the transition position L2) and drives the second connecting portion 224 of the second linking member 220 moves upward, so the second linking member 220 is driven to rotate about the second rotation axis 102 clockwise. In other words, when the pressing force is applied to the first linking member 210, the first linking member 210 drives the second linking member 220 to move, so the first linking member 210 and the second linking member 220 rotate in opposite directions with respect to the base 10. For example, the first linking member 210 rotates counterclockwise to move the actuating portion 216 close to the base 10 and drive the second linking member 220 to rotate clockwise to move the second connecting portion 224 away from the base 10.

As shown in FIG. 2C, when the first linking member 210 drives the second linking member 220 to rotate in the opposite direction with respect to the base 10 until the coupling axis 201 can no longer move upward relative to the base 10, the coupling axis 201 reaches the pressing stop position L3. Specifically, in the key structure 1, through the linkage of the first linking member 210 and the second linking member 220, the movements of the first linking member 210 and the second linking member 220 are associated with other to limit the rotation range of the first linking member 210 and the second linking member 220 relative to the base 10, thereby achieving a non-collision pressing stop point. In other words, the key structure 1 can achieve the limiting effect without collision between components to effectively reduce the abnormal sound. It is noted that the pressing stop position L3 of the coupling axis 201 can be determined according to the inclined angle of the first connecting portion 214 with respect to the first pivoting portion 212, the length of the first connection section **214*a*, the length of the second connection section 224*a*, etc. In other words, the pressing stop position L3 of the coupling axis 201 can be determined according to the relative positions among the first rotation axis 101, the coupling axis 201, and the second rotation axis 102**.

When the pressing force is released, the restoring member 30 provides the restoring force to enable the acting portion 314 to push the lower surface 213 of the first linking member 210 upward, so as to drive the first linking member 210 to rotate clockwise, and the first connecting portion 214 drives the second linking member 220 to rotate counterclockwise. As such, the key structure 1 returns from the pressing stop state of FIG. 2C through the transition state of FIG. 2B to the non-pressed state of FIG. 2A (i.e., the position before the pressing force is applied).

Figure 3:
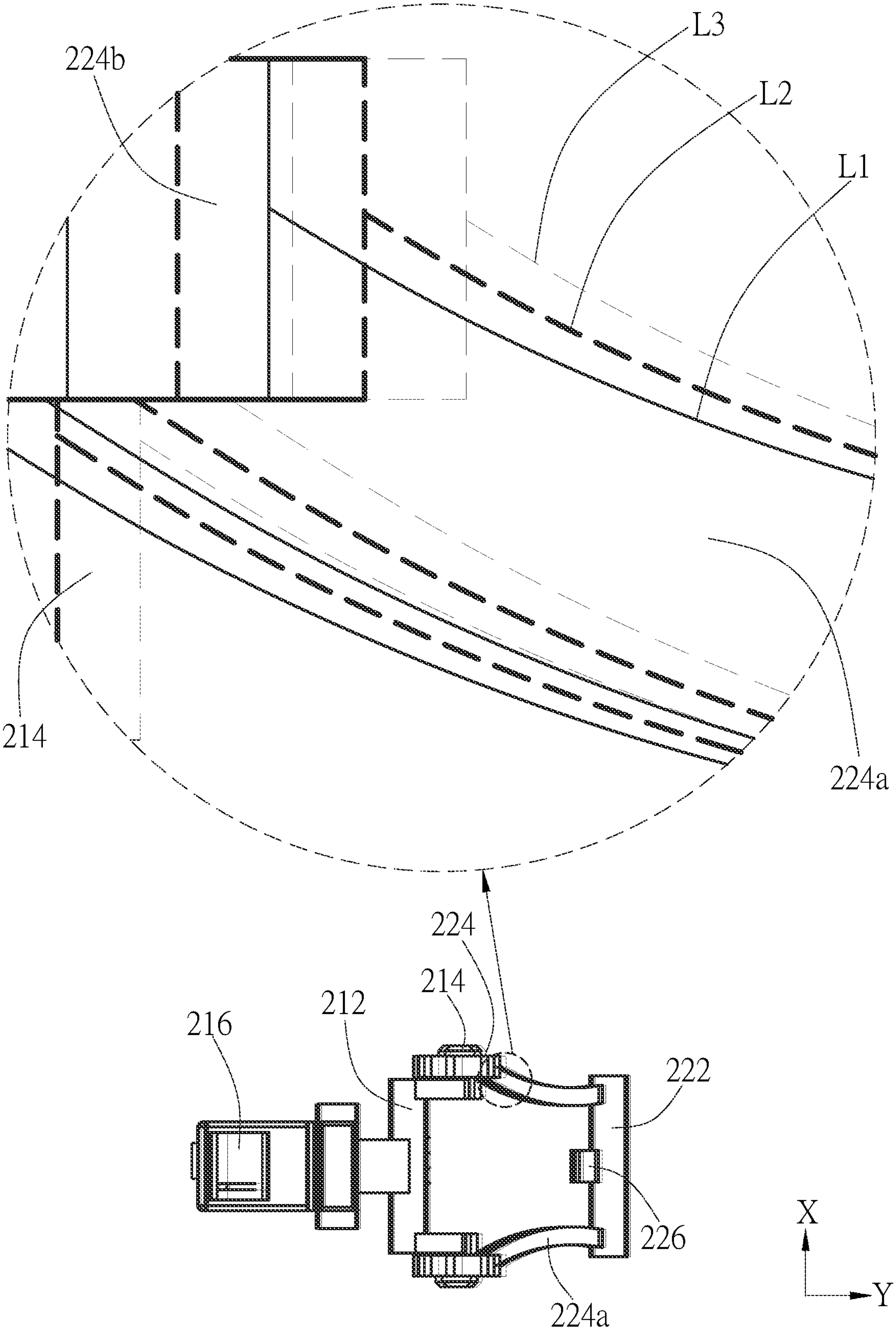
FIG. 3 is a schematic view showing the deformation of the key structure of FIG. 1C from the non-pressed state through the transition state to the pressing stop state.

Referring to FIG. 3, FIG. 3 is a schematic view showing the deformation of the linkage mechanism 20 when the coupling axis 201 of the key structure 1 of FIG. 1C is at the non-pressed position L1, the transition position L2, and the pressing stop position L3. As shown in the enlarged view of FIG. 3, when the pressing force is applied to the first linking member 210, the first linking member 210 and the second linking member 220 are substantially immovable relative to each other in the Y-axis direction (i.e., the positions of the first pivoting portion 212 and the second pivoting portion 222 are substantially fixed, or the positions of the first rotation axis 101 and the second rotation axis 102 are substantially fixed). The first linking member 210 and the second linking member 220 are squeezed relative to each other, and the second connection section **224*a* can be elastically deformed, so the user can experience the click feedback during the deformation of the linkage mechanism 20 from the non-pressed position L1 to the pressing stop position L3, enhancing the tactile feedback of the key structure 1. In other words, the key structure 1 can not only use the displacement limitation of the linkage mechanism 20 to reduce the abnormal sound caused by collision of components of the keyswitch, but also use the deformation of the linkage mechanism 20 to provide the click feedback, so the user can experience the soundless click feedback. It is noted that in this embodiment, the second connection sections 224*a* of the second linking member 220 are elastically deformed, but not limited thereto. In other embodiments, by modifying the design of the first linking member and the second linking member according to practical applications, when the first linking member 210 drives the second linking member 220 to move, at least one of the first connection section 214*a* and the second connection section 224*a*** can be elastically deformed to provide the click feedback.

Figure 4A:
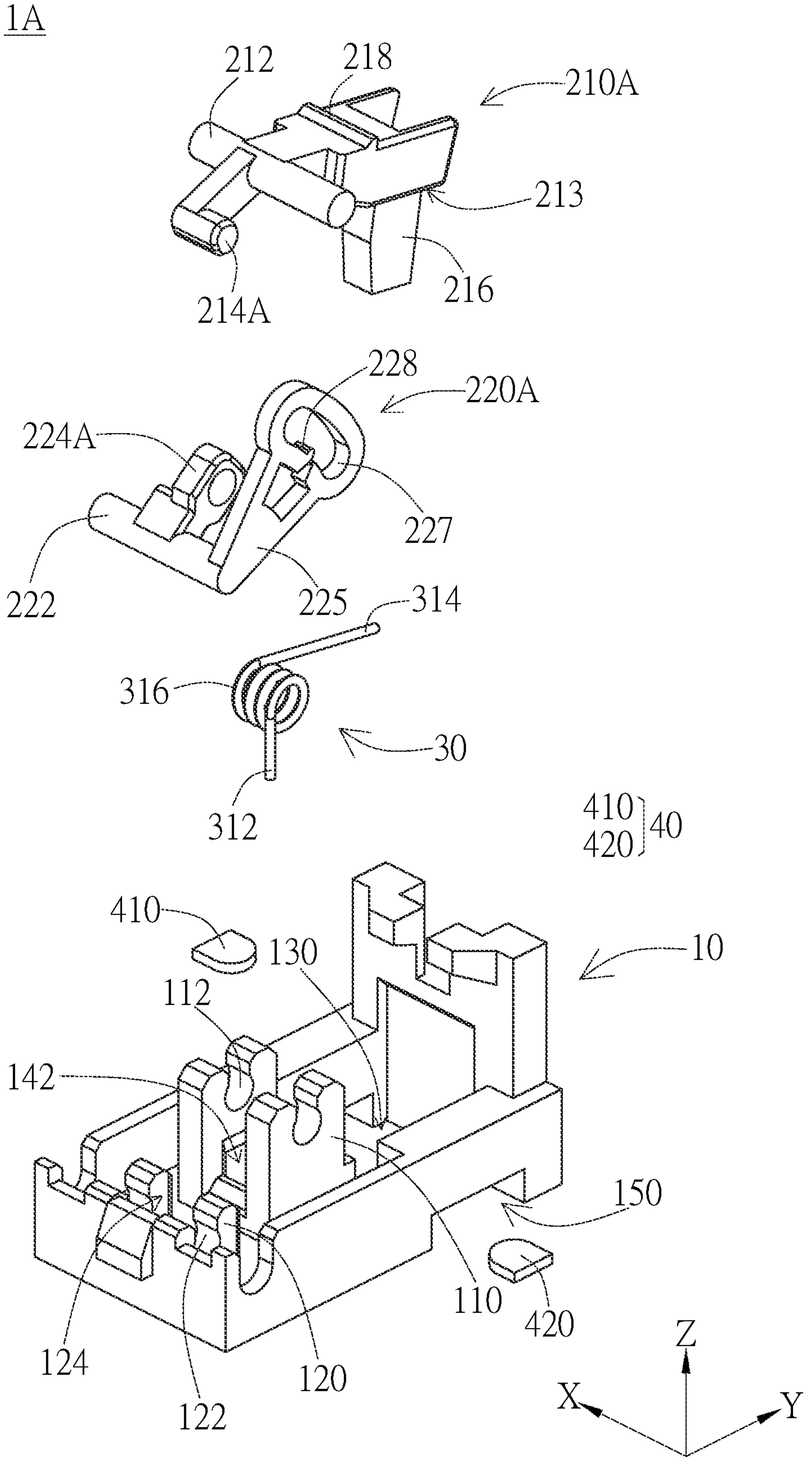
FIG. 4A to FIG. 4C are an exploded view, a partially exploded view, and an assembled view of the key structure in a second embodiment of the invention, respectively.
Figure 4B:
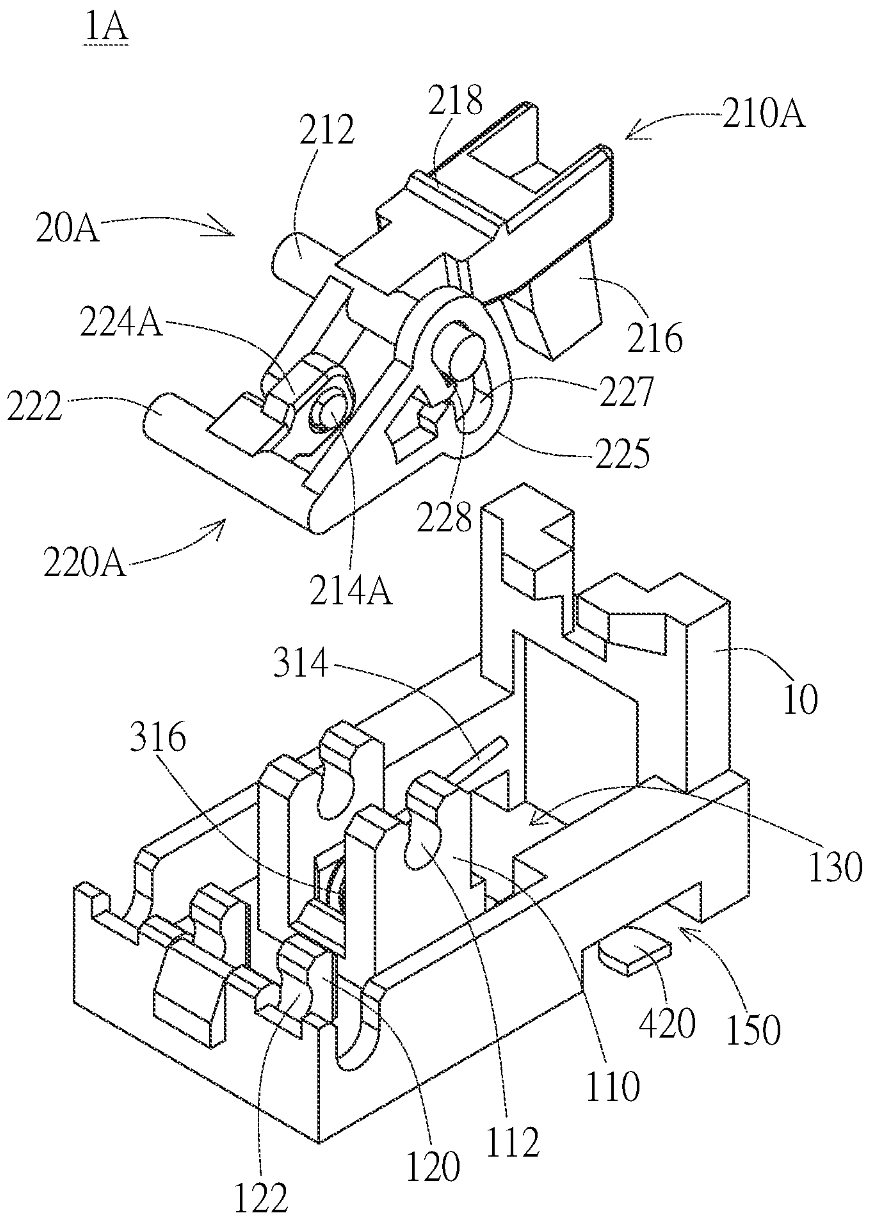
Figure 4C:
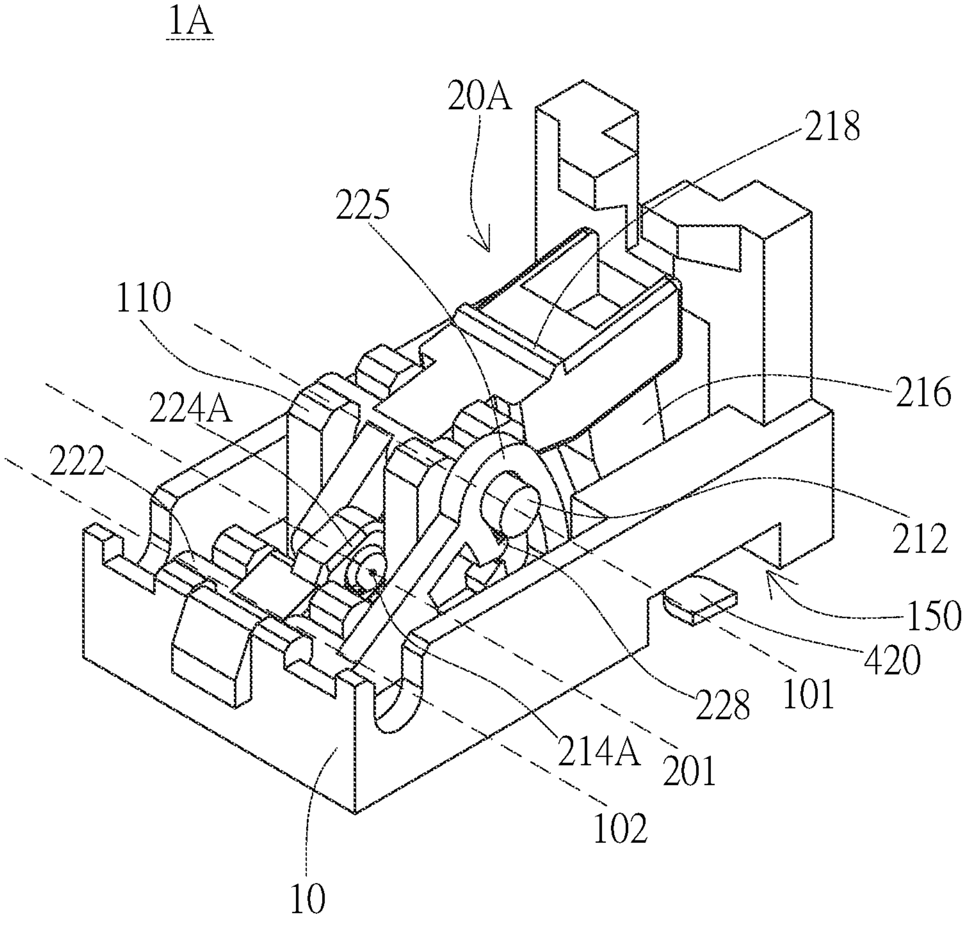

FIG. 4A to FIG. 4C are an exploded view, a partially exploded view, and an assembled view of the key structure 1A in a second embodiment of the invention, respectively. The key structure 1A includes a base 10 and a linkage mechanism 20A. The linkage mechanism 20A includes a first linking member 210A and a second linking member 220A. In this embodiment, the base 10 has a structure similar to FIG. 1A, and the linkage mechanism 20A can have a linking limitation similar to the linkage mechanism 20 of FIG. 1A. For example, the respective rotatable coupling mechanism of the first linking member 210A and the second linking member 220A of the linkage mechanism 20A to the base 10, the structure and function of the restoring member 30 and the switch unit 40 can be referred to the related descriptions of the first embodiment and will not elaborate again. Moreover, the first linking member 210A of the linkage mechanism 20A has the first pivoting portion 212, the actuating portion 216, the positioning portion 218, the lower surface 213, etc. similar to the first embodiment, and the second linking member 220A has the second pivoting portion 222 similar to the first embodiment. Hereinafter, the difference between the linkage mechanism 20A and the linkage mechanism 20 will be described.

As shown in FIG. 4A to FIG. 4C, the first connecting portion 214A of the first linking member 210A and the second connecting portion 224A of the second linking member 220A couple with each other to form the coupling axis 201 through the coupling mechanism of a pivot and a pivotal hole. Specifically, the first connecting portion 214A extends inclinedly downward from the middle section of the first pivoting portion 212 to form a pivot extending along the X-axis direction at the distal end. The second connecting portion 224A extends from the middle section of the second pivoting portion 222 toward the first linking member 210A to form a corresponding pivotal hole at the distal end.

In this embodiment, the second linking member 220A further includes a tactile feedback portion 225. The tactile feedback portion 225 is connected to the second pivoting portion 222 and adapted to movably couple with the first pivoting portion 212. When the first linking member 210A drives the second linking member 220A to move, the tactile feedback portion 225 moves relative to the first pivoting portion 212 to interfere with the first pivoting portion 212. Specifically, the tactile feedback portion 225 has a protrusion 228, and the protrusion 228 is disposed corresponding to the first pivoting portion 212. When the tactile feedback portion 225 moves relative to the first pivoting portion 212, the protrusion 228 interferes with the first pivoting portion 212. For example, the tactile feedback portion 225 is connected to one end of the second pivoting portion 222 and extends toward the first pivoting portion 212. In this embodiment, the tactile feedback portion 225 can be implemented as a sector-shaped or angular-shaped tactile feedback portion 225. The apex portion of the sector-shaped or angular-shaped tactile feedback portion 225 is connected to the second pivoting portion 222, and the arch portion or the bottom side of the sector-shaped or angular-shaped tactile feedback portion 225 corresponds to the first pivoting portion 212 and is formed with a groove 227. The protrusion 228 is disposed at one side of the groove 227 corresponding to the first pivoting portion 212. The protrusion 228 is preferably located at the middle section of the groove 227 and protrudes toward the groove 227. When the tactile feedback portion 225 moves relative to the first pivoting portion 212, the first pivoting portion 212 preferably moves from one end of the groove 227 to the other end of the groove 227 and interacts with the protrusion 228 during the movement.

As shown in FIG. 4A to FIG. 4C and FIG. 5A, when the key structure 1A is assembled, the positioning portion 312 of the restoring member 30 is inserted into the positioning hole 144 of the base 10, the spring body 316 is disposed in the accommodation space 142, which is located between the two pivotal holes 112 of the first coupling portion 110 of the base 10, so the spring body 316 is located under the first pivoting portion 212 of the first linking member 210A, and the acting portion 314 extends toward a direction away from the first connecting portion 214A to be in contact with the lower surface 213 of the first linking member 210A. The first connecting portion 214A of the first linking member 210A and the second connecting portion 224A of the second linking member 220A are rotatably connected (i.e., the pivot and the pivotal hole are pivotally connected) to form the coupling axis 201. The first pivoting portion 212 of the first linking member 210A is rotatably connected to the pivotal holes 112 of the first coupling portion 110 of the base 10 to form the first rotation axis 101, so the actuating portion 216 of the first linking member 210A is disposed corresponding to the opening 130 of the base 10. The second pivoting portion 222 of the second linking member 220A is rotatably connected to the pivotal holes 122 of the second coupling portion 120 of the base 10 to form the second rotation axis 102, and the second connecting portion 224A of the second linking member 220A is located between the two pivotal hoes 122 of the second coupling portion 120 (e.g. in the positioning space 124 as described in the previous embodiment) to limit the lateral movement of the second linking member 220A (e.g. the movement in the X-axis direction). The tactile feedback portion 225 couples with the first pivoting portion 212. For example, one end of the first pivoting portion 212 is inserted into the groove 227, so the first pivoting portion 212 is located at the upper end of the groove 227, and the tactile feedback portion 225 is located at the outer side of the pivotal hole 112 of the first coupling portion 110.

Figure 5A:
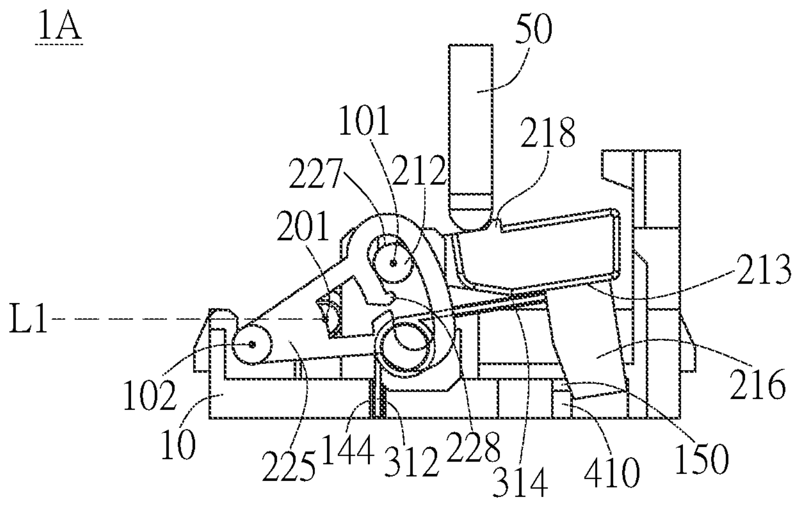
Figure 5B:
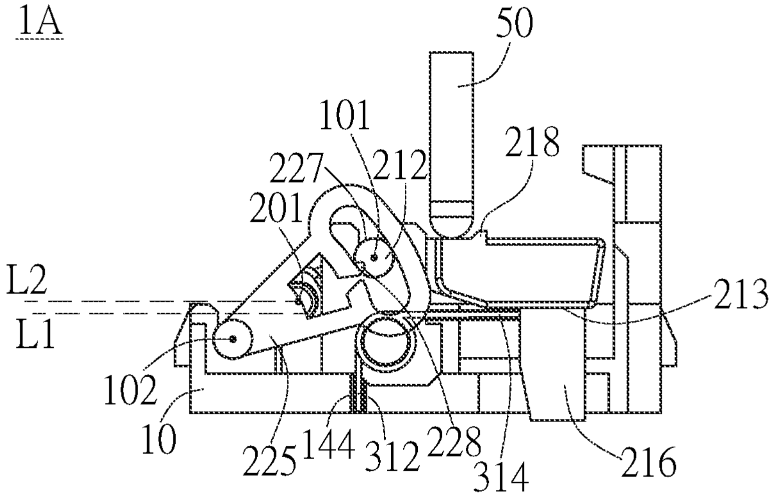
Figure 5C:
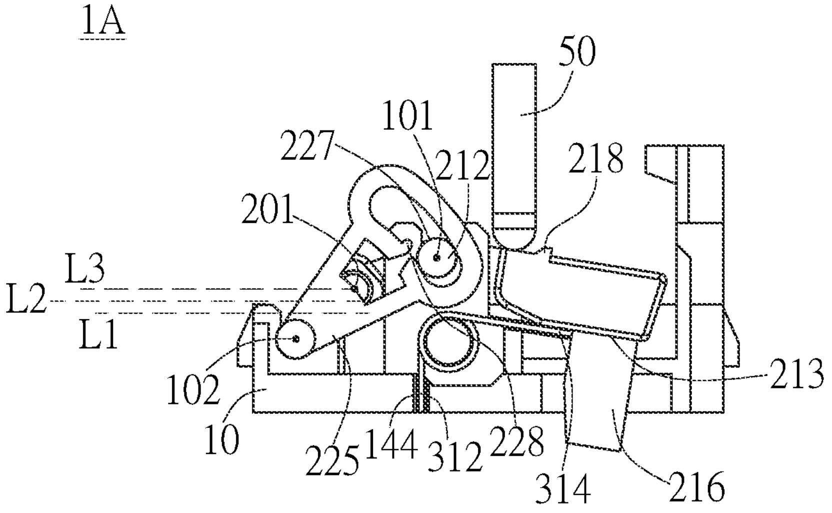

Referring to FIG. 5A to FIG. 5C, the operation of the key structure 1A is illustrated. FIG. 5A to FIG. 5C show that the key structure 1A are in the non-pressed state, the transition state, and the pressing stop state, respectively. As shown in FIG. 5A, when the pressing force is not applied to the linkage mechanism 20A, the linkage mechanism 20A supports the key structure 1A in the non-pressed state by the restoring force provided by the restoring member 30. When the key structure 1A is in the non-pressed state, the coupling axis 201 of the first linking member 210A and the second linking member 220A formed by coupling the first connecting portion 214A and the second connecting portion 224A is located at the non-pressed position L1, and the first pivoting portion 212 is located at the upper end of the groove 227 of the tactile feedback portion 225. The operation member 50 is positioned by the positioning portion 218 of the first linking member 210A, and the actuating portion 216 of the first linking member 210A does not shield or partially shields the light channel 150, so the intensity of the optical signal received by the receiver 420 from the emitter 410 is stronger (i.e., the amount of light received is larger).

As shown in FIG. 5B, when the pressing force is applied to the linkage mechanism 20A (e.g. to the first linking member 210A) by the operation member 50, the positions of the first rotation axis 101 and the second rotation axis 102 relative to the base 10 substantially remain unchanged, and the first linking member 210A and the second linking member 220A move associated with each other to restrict the rotation range of the first linking member 210A and the second linking member 220A with respect to the base 10. For example, the first linking member 210A rotates about the first rotation axis 101 clockwise (i.e., along the first direction) to drive the coupling axis 201 to move away from the base 10, so the second linking member 220A is driven to rotate about the second rotation axis 102 counterclockwise (i.e., along the second direction), and the tactile feedback portion 225 moves upward relative to the first pivoting portion 212. Specifically, when the first linking member 210A rotates about the first rotation axis 101 to drive the actuating portion 216 to rotate clockwise toward the base 10, the lower surface 213 of the first linking member 210A pushes the acting portion 314 of the restoring member 30, so the acting portion 314 moves downward relative to the positioning portion 312, and the acting portion 314 is elastically deformed with respect to the positioning portion 312. The actuating portion 216 rotates with the first linking member 210A to a position that the light channel 150 can be shielded. As such, the intensity of the optical signal received by the receiver 420 from the emitter 410 is smaller (e.g. the amount of light is less) or substantially equal to zero (i.e., the receiver 420 does not receive the optical signal), and the switch unit 40 is triggered to generate the triggering signal. Meanwhile, the first connecting portion 214A of the first linking member 210A rotates clockwise away from the base 10 (i.e., the coupling axis 201 moves upward to the transition position L2) and drives the second connecting portion

224A of the second linking member 220A and the tactile feedback portion 225 to move upward, so the second linking member 220A is driven to rotate about the second rotation axis 102 counterclockwise. In other words, when the pressing force is applied to the first linking member 210A, the first linking member 210A drives the second linking member 220A to move, so the first linking member 210A and the second linking member 220A rotate in opposite directions with respect to the base 10. For example, the first linking member 210A rotates clockwise to drive the actuating portion 216 to rotate toward the base 10, and the second linking member 220A is driven to rotate counterclockwise to drive the second connecting portion 224A and the tactile feedback portion 225 to rotate away from the base 10. When the tactile feedback portion 225 moves upward to enable the protrusion 228 to pass the first pivoting portion 212, the protrusion 228 interacts with the first pivoting portion 212, and the protrusion 228 is pushed by the first pivoting portion 212 to elastically deform so as to pass the first pivoting portion 212. In other words, when the first pivoting portion 212 moves relative to the tactile feedback portion 225 from the upper end of the groove 227 to the lower end of the groove 227, the first pivoting portion 212 encounters the protrusion 228 and pushes the protrusion 228 away from the groove 227, so the first pivoting portion 212 can pass the protrusion 228 and continue to move to the lower end of the groove 227.

As shown in FIG. 5C, when the first linking member 210A drives the second linking member 220A to rotate with respect to the base 10 until the coupling axis 201 can no longer move upward relative to the base 10 (i.e., the rotation range of the first linking member 210A and the second linking member 220A with respect to the base 10 is restricted by the associated movement of the first linking member 210A and the second linking member 220A), the coupling axis 201 reaches the pressing stop position L3. Specifically, in the key structure 1A, through the linkage of the first linking member 210A and the second linking member 220A, the non-collision pressing stop point can be achieved. In other words, the key structure 1A can achieve the limiting effect without collision between components to effectively reduce the abnormal sound. It is noted that the pressing stop position L3 of the coupling axis 201 can be determined according to the inclined angle of the first connecting portion 214A with respect to the first pivoting portion 212, the length of the first connecting portion 214A, the length of the second connecting portion 224A, the length of the groove 227, etc. In other words, the pressing stop position L3 of the coupling axis 201 can be determined according to the relative positions among the first rotation axis 101, the coupling axis 201, and the second rotation axis 102, and the apex angle of the sector-shaped or angular-shaped tactile feedback portion 225 (or the length of the groove 227).

When the pressing force is released, the restoring member 30 provides the restoring force to enable the acting portion 314 to push the lower surface 213 of the first linking member 210A upward, so as to drive the first linking member 210A to rotate counterclockwise, and the first connecting portion 214A drives the second linking member 220A to rotate clockwise. As such, the key structure 1A returns from the pressing stop state of FIG. 5C through the transition state of FIG. 5B to the non-pressed state of FIG. 5A (i.e., the position before the pressing force is applied).

In the second embodiment, for the key structure 1A, during the movement of the linkage mechanism 20A, the first pivoting portion 212 of the first linking member 210A moves in the groove 227 relative to the tactile feedback portion 225 to interact with the protrusion 228, and the protrusion 228 is pushed to elastically move away from the groove 227 to provide the click feedback, so the key structure 1A can provide a soundless tactile feedback. It is noted that in this embodiment, the tactile feedback portion 225 is illustrated to have a sector shape or an angular shape for coupling with the first pivoting portion 212, but not limited thereto. In other embodiments, the shape of the tactile feedback portion 225 can be modified according to practical applications.

Figure 6A:
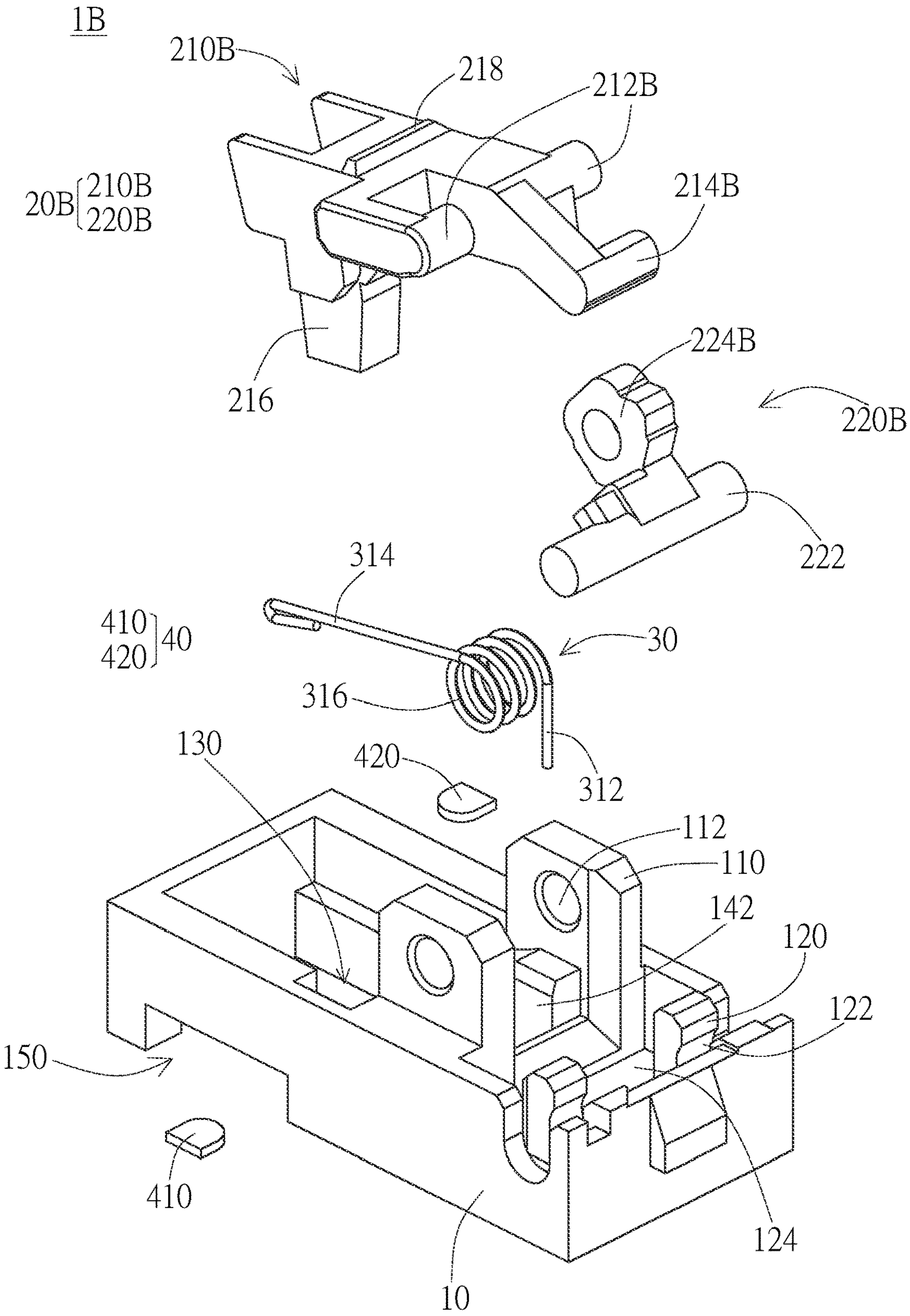
FIG. 6A and FIG. 6B are an exploded view and an assembled view of the key structure in a third embodiment of the invention, respectively.
Figure 6B:
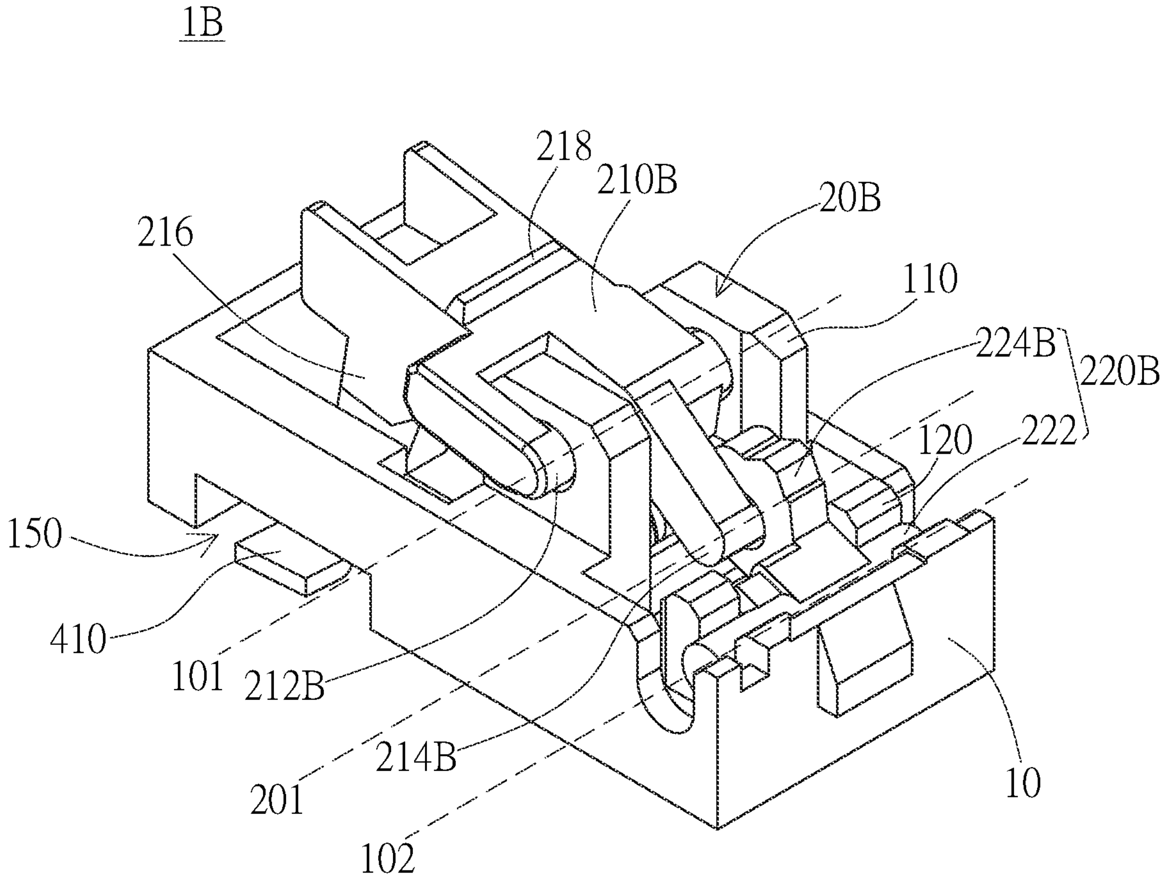

FIG. 6A and FIG. 6B are an exploded view and an assembled view of the key structure 1B in a third embodiment of the invention, respectively. The key structure 1B includes a base 10 and a linkage mechanism 20B. The linkage mechanism 20B includes a first linking member 210B and a second linking member 220B. In this embodiment, the base 10 has a structure similar to FIG. 1A, and the linkage mechanism 20B can have a linking limitation similar to the linkage mechanism 20 or 20A. For example, the respective rotatable coupling mechanism of the first linking member 210B and the second linking member 220B of the linkage mechanism 20B to the base 10, the structure and function of the restoring member 30 and the switch unit 40 can be referred to the related descriptions of the first embodiment and will not elaborate again. Moreover, the first linking member 210B of the linkage mechanism 20B has the actuating portion 216, the positioning portion 218, the lower surface 213, etc. similar to the first embodiment, and the first linking member 210B of the linkage mechanism 20B has the first connecting portion 214B similar to the second embodiment. The second linking member 220A has the second pivoting portion 222 and a second connecting portion 224B similar to the second embodiment. Hereinafter, the difference between the linkage mechanism 20B and the linkage mechanism 20 or 20A will be described.

As shown in FIG. 6A and FIG. 6B, the first pivoting portion 212B of the first linking member 210B can be implemented as two pivots, which extend along the X-axis direction and are spaced apart from each other. In this embodiment, the two pivots of the first pivoting portion 212B preferably extend toward the same direction, so one of the two pivots couples with one pivot hole 112 of the first coupling portion 110 from the outer side to the inner side, and the other of the two pivots couples with the other pivotal hole 112 of the first coupling portion 110 from the inner side to the outer side, but not limited thereto. The first connecting portion 214B extends inclinedly downward from one of the pivots of the first pivoting portion 212, and the first connecting portion 214B is preferably located between the two pivots to couple with the second connecting portion 224B of the second linking member 220B. In other words, the first connecting portion 214B and the second connecting portion 224B couple with each other to form the coupling axis 201 through the coupling mechanism of a pivot and a pivotal hole.

Figure 7A:
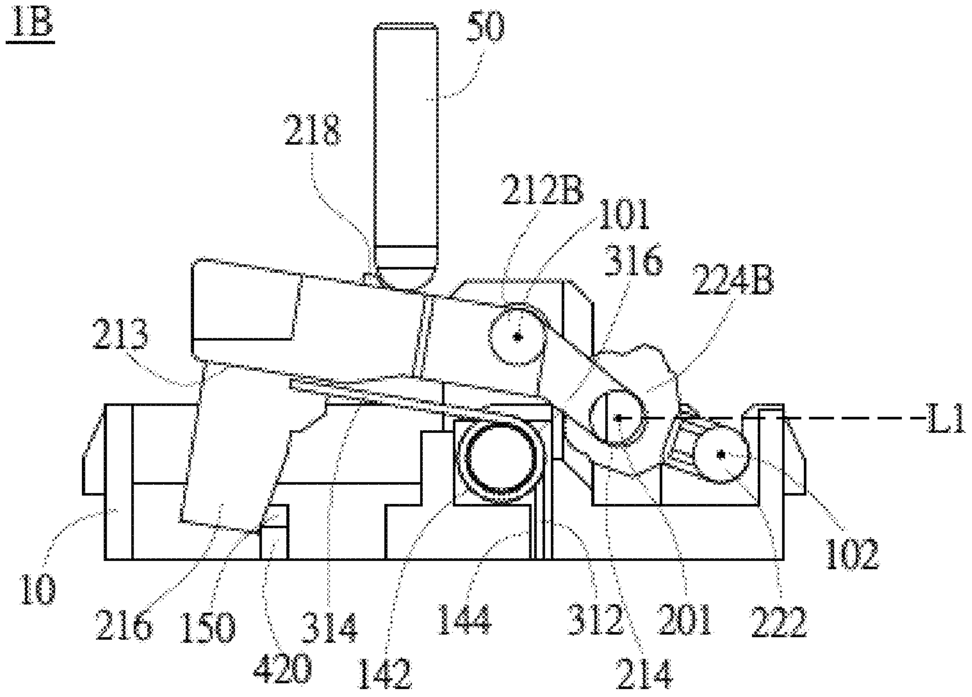
Figure 7B:
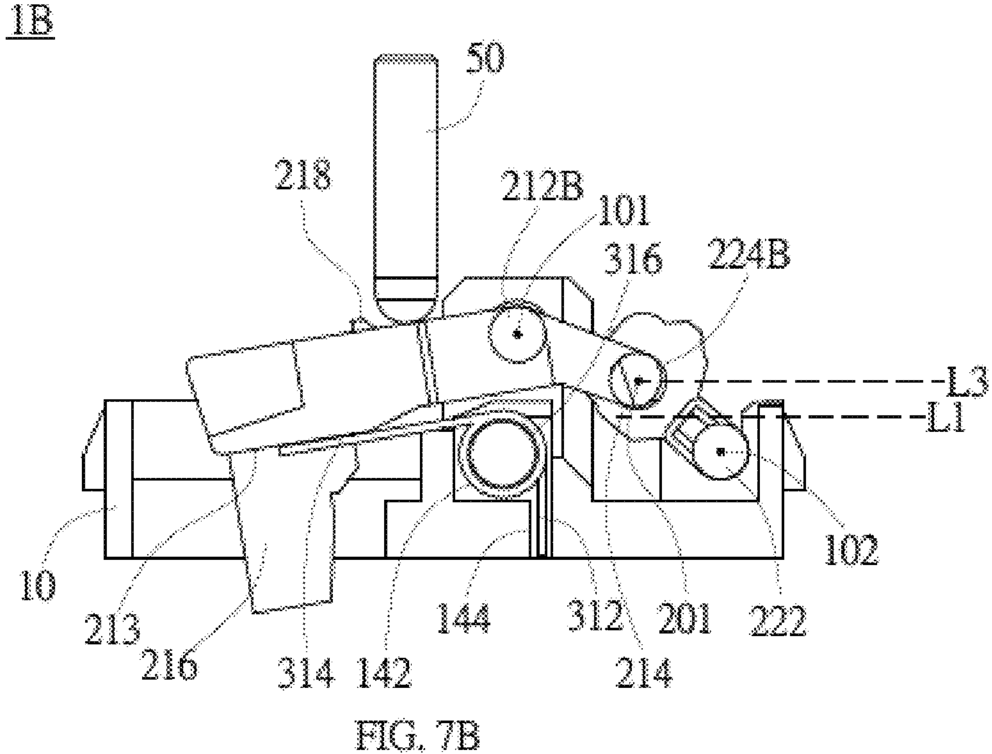

Referring to FIG. 7A and FIG. 7B, the operation of the key structure 1B is illustrated. FIG. 7A and FIG. 7B show that the key structure 1B are in the non-pressed state and the pressing stop state, respectively. As shown in FIG. 7A, when the pressing force is not applied to the linkage mechanism 20B (e.g. the first linking member 210B), the linkage mechanism 20B supports the key structure 1B in the non-pressed state by the restoring force provided by the restoring member 30. When the key structure 1B is in the non-pressed state, the coupling axis 201 of the first linking member 210B and the second linking member 220B formed by coupling the first connecting portion 214B and the second connecting portion 224B is located at the non-pressed position L1. The operation member 50 is positioned by the positioning portion 218 of the first linking member 210B, and the actuating portion 216 of the first linking member 210B does not shield or partially shields the light channel 150, so the intensity of the optical signal received by the receiver 420 from the emitter 410 is stronger (i.e., the amount of light received is larger).

As shown in FIG. 7B, when the pressing force is applied to the first linking member 210B of the linkage mechanism 20B by the operation member 50, the first linking member 210B rotates about the first rotation axis 101 along a first direction (e.g. counterclockwise) to drive the coupling axis 201 to move relative to the base 10, so the second linking member 220B is driven to rotate about the second rotation axis 102 along a second direction (e.g. clockwise). As such, the first linking member 2106 and the second linking member 220B move associated with each other to restrict the rotation range of the first linking member 210B and the second linking member 220B with respect to the base 10, and the coupling axis 201 moves to the pressing stop position L3. Specifically, when the first linking member 210B rotates about the first rotation axis 101 to enable the actuating portion 216 to rotate counterclockwise toward the base 10, the lower surface 213 of the first linking member 210B pushes the acting portion 314 of the restoring member 30, so the acting portion 314 moves downward relative to the positioning portion 312, and the acting portion 314 is elastically deformed with respect to the positioning portion 312. The actuating portion 216 rotates with the first linking member 210B to a position that the light channel 150 can be shielded. As such, the intensity of the optical signal received by the receiver 420 from the emitter 410 is smaller (e.g. the amount of light received is less) or substantially equal to zero (i.e., the receiver 420 does not receive the optical signal), and the switch unit 40 is triggered to generate the triggering signal. Meanwhile, the first connecting portion 214B of the first linking member 210B rotates counterclockwise away from the base 10 (i.e., the coupling axis 201 moves upward to the pressing stop position L3) and drives the second connecting portion 224B of the second linking member 220B to move upward, so the second linking member 220B is driven to rotate about the second rotation axis 102 clockwise. In other words, when the pressing force is applied to the first linking member 2106, the first linking member 210B drives the second linking member 220B to move, so the first linking member 210B and the second linking member 220B rotate in opposite directions with respect to the base 10. For example, the first linking member 2106 rotates counterclockwise to enable the actuating portion 216 to move toward the base 10, and the second linking member 220B is driven to rotate clockwise to enable the second connecting portion 224B to move away from the base 10.

When the pressing force is released, the restoring member 30 provides the restoring force to enable the acting portion 314 to push the lower surface 213 of the first linking member 210B upward, so as to drive the first linking member 210B to rotate clockwise. As such, the first connecting portion 214B drives the second linking member 220B to rotate counterclockwise, and the key structure 1B returns from the pressed state of FIG. 7B to the non-pressed state of FIG. 7A. Specifically, in the key structure 1B, through the linkage of the first linking member 210B and the second linking member 220B, the movements of the first linking member 210B and the second linking member 220B are associated with each other to limit the rotation range of the first linking member 210B and the second linking member 220B relative to the base 10, thereby achieving a non-collision pressing stop point. In other words, the key structure 1B can achieve the limiting effect without collision between components to effectively reduce the abnormal sound.

Figure 8A:
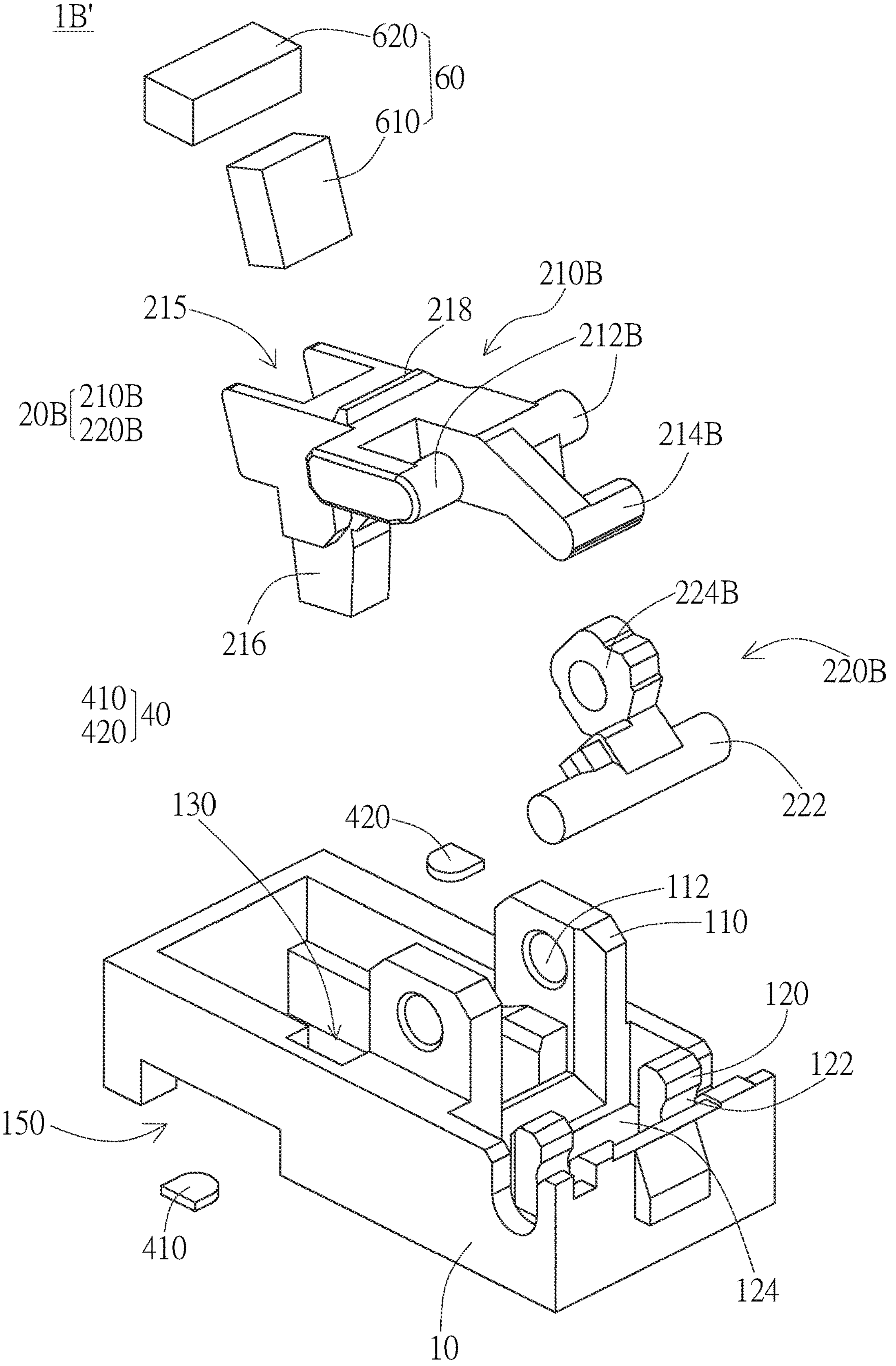
FIG. 8A and FIG. 8B are an exploded view and an assembled view of the key structure in a fourth embodiment of the invention, respectively.
Figure 8B:
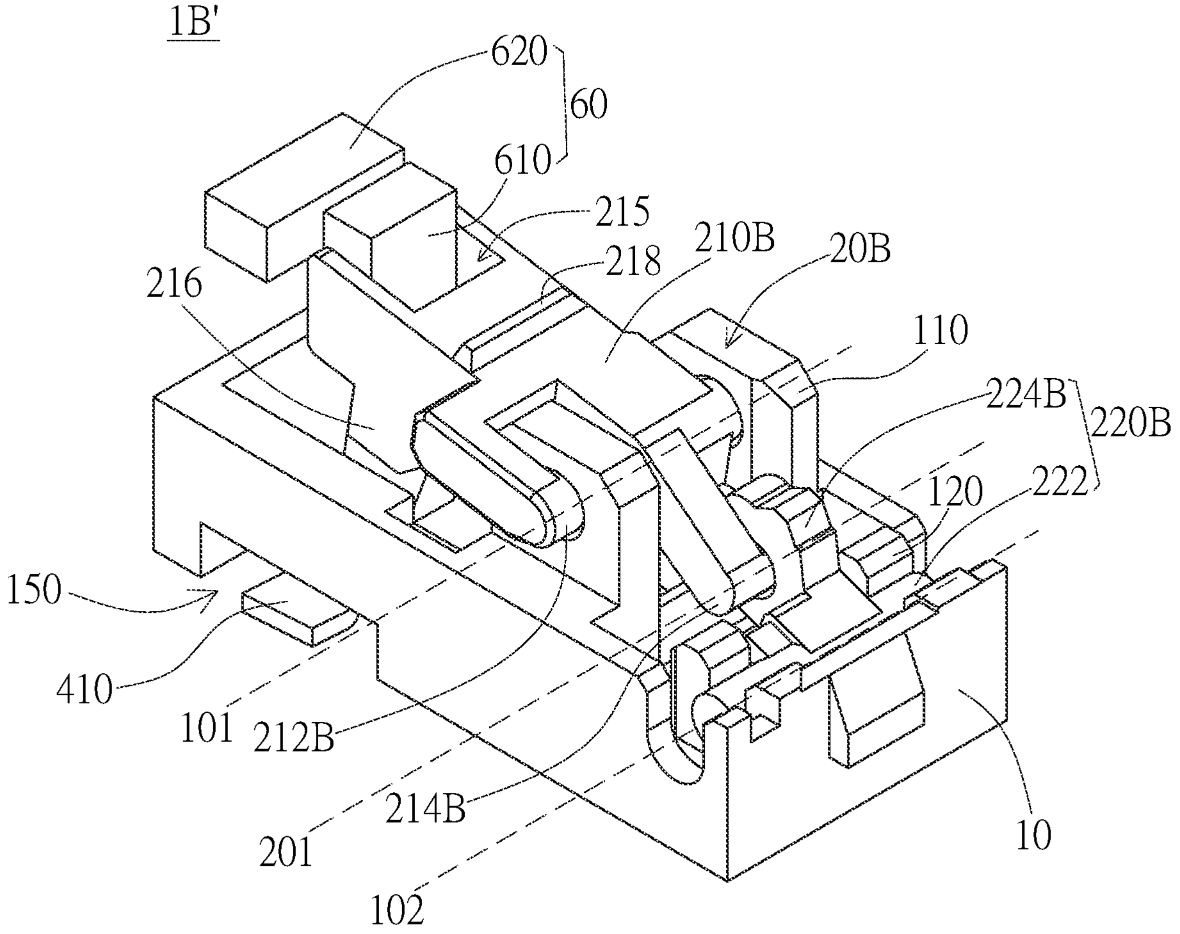
Figure 18A:
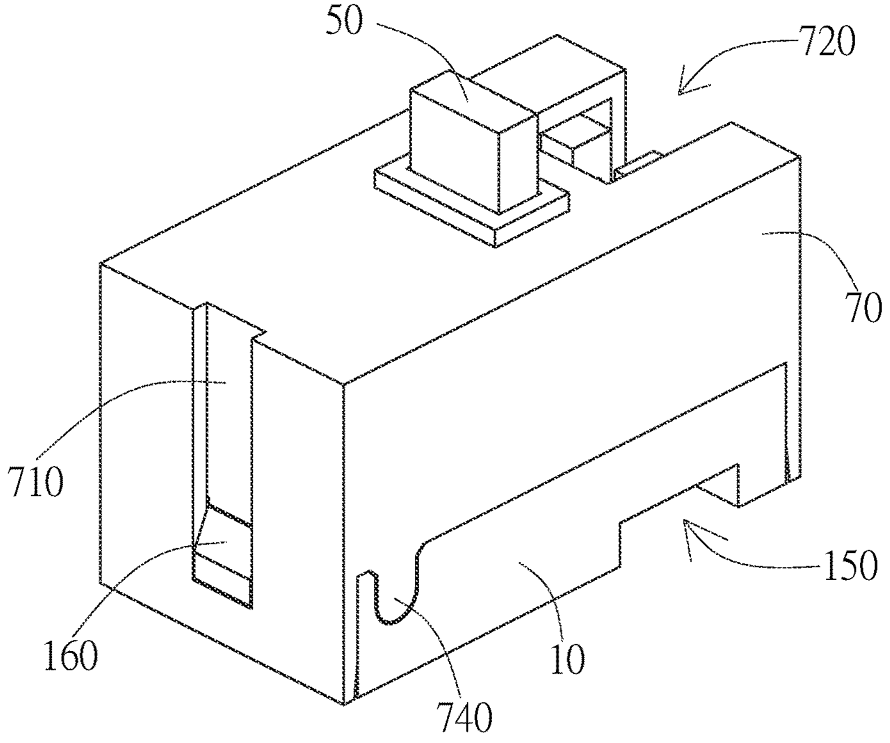
FIG. 18A and FIG. 18B are schematic views of the housing of the key structure in an embodiment of the invention from different viewing angles.
Figure 18B:
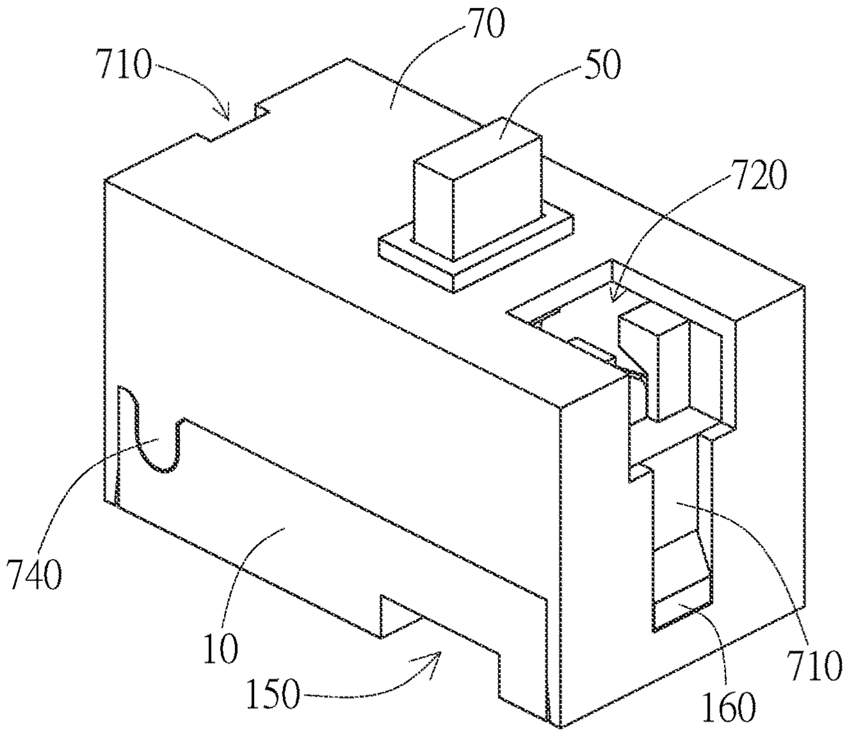
Figure 19A:
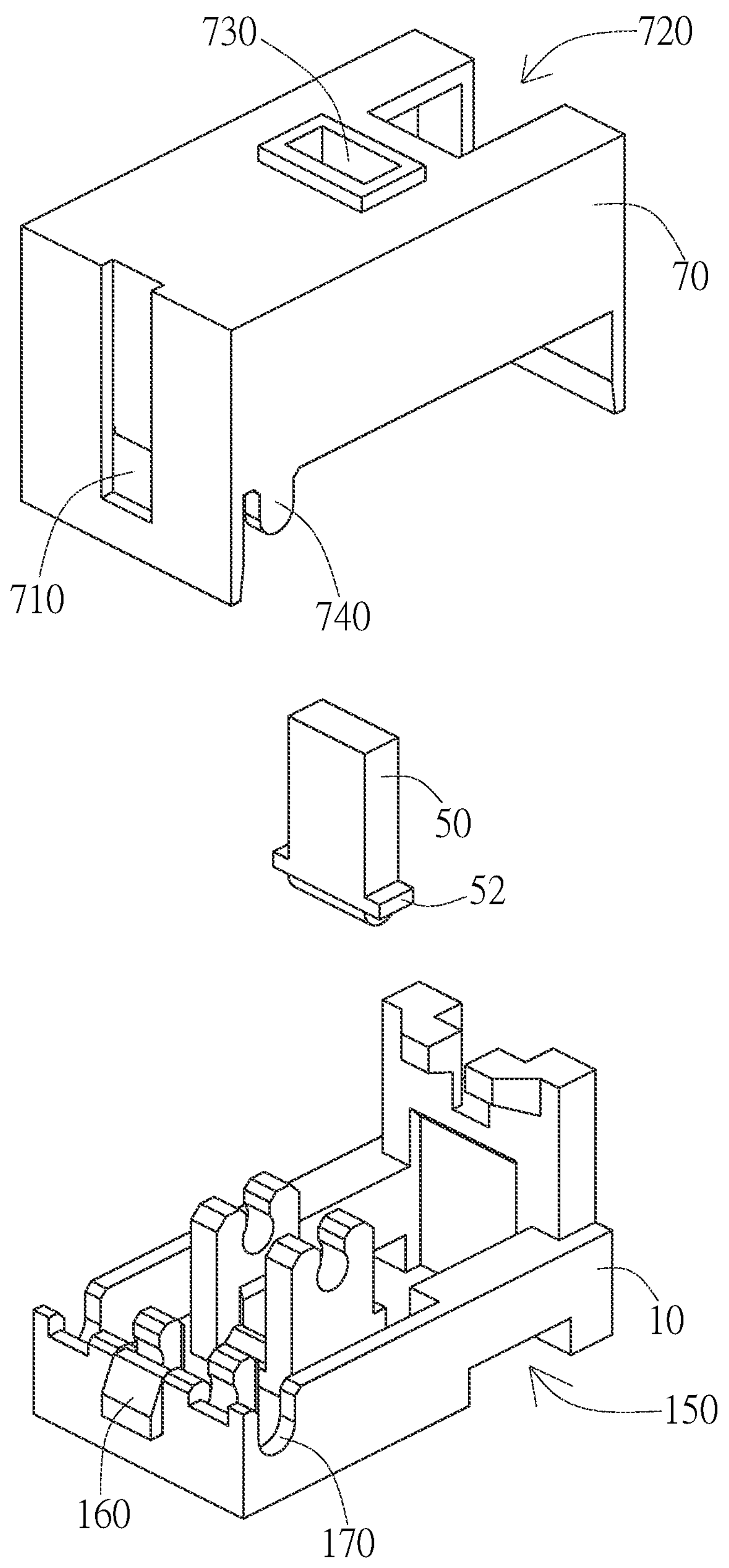
FIG. 19A and FIG. 19B are exploded views of the housing of the key structure of FIG. 18A and FIG. 18B, respectively.
Figure 19B:
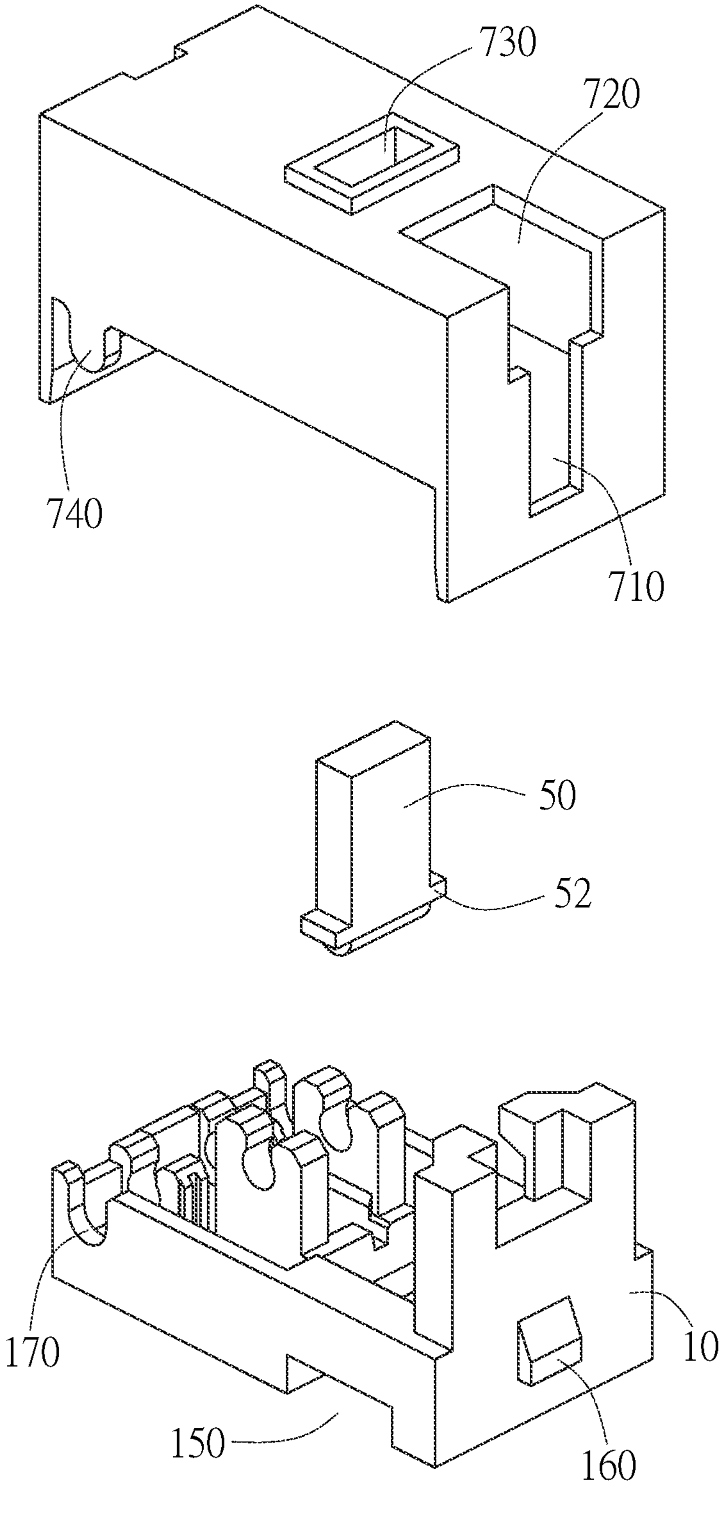

FIG. 8A and FIG. 8B are an exploded view and an assembled view of the key structure 1B' in a fourth embodiment of the invention, respectively. The key structure 1B' of FIG. 8A is a variant embodiment of the key structure 1B of FIG. 6A. Thus, the detailed structure and function of components of the key structure 1B' can be referred to the related descriptions of the previous embodiments and will not elaborate again. As shown in FIG. 8A and FIG. 8B, the key structure 1B' may include a magnetic unit 60 as the restoring member, instead of the spring type restoring member 30 of FIG. 6A. The magnetic unit 60 includes a first magnetic member 610 and a second magnetic member 620. The first magnetic member 610 and the second magnetic member 620 can be implemented as both magnets or a combination of a magnet and a ferromagnetic material. The first magnetic member 610 is disposed on the linkage mechanism 20B, and the second magnetic member 620 is disposed corresponding to the first magnetic member 610 to produce a magnetic attraction force. Specifically, the first magnetic member 610 can be disposed on any suitable position of the first linking member 210B (or so-called movable member) of the linkage mechanism 20B, and the first magnetic member 610 is preferably located at the same side as the actuating portion 216 with respect to the first pivoting portion 212. Corresponding to the disposition of the first magnetic member 610, the first linking member 210B has a receiving portion 215 adapted to receive the first magnetic member 610. In this embodiment, the receiving portion 215 can be a cavity formed on the first linking member 210B, and the first magnetic member 610 can be at least partially received in the cavity, but not limited thereto. In other embodiments, the receiving portion 215 can be a surface space of the first linking member 210B, and the first magnetic member 610 can be attached to the first linking member 210B by engaging or adhering. As such, when the first linking member 210B moves relative to the base 10, the first magnetic member 610 can move with the first linking member 210B. The second magnetic member 620 is preferably disposed corresponding to the first magnetic member 610, so the magnetic attraction force can be generated between the first magnetic member 610 and the second magnetic member 620 to support the key structure 1B' in the non-pressed state. For example, the second magnetic member 620 can be disposed on the base 10 or other components of the key structure 1B' (e.g. the cover 70 of FIG. 18A, but not limited thereto).

Figure 9A:
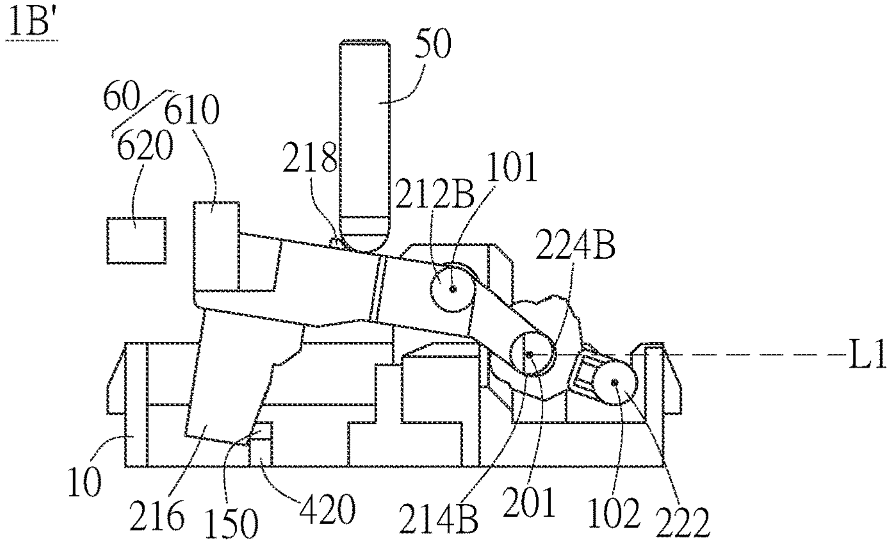
Figure 9B:
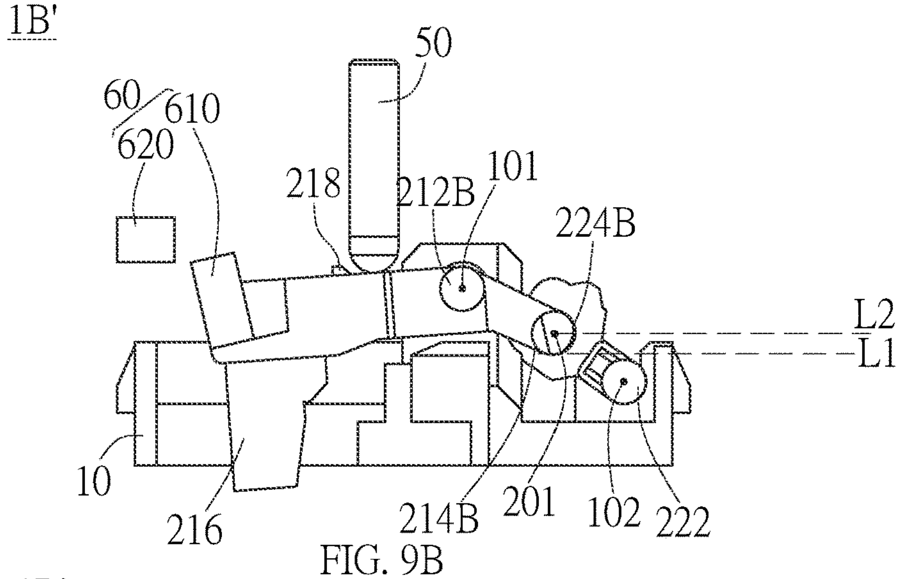
Figure 9C:
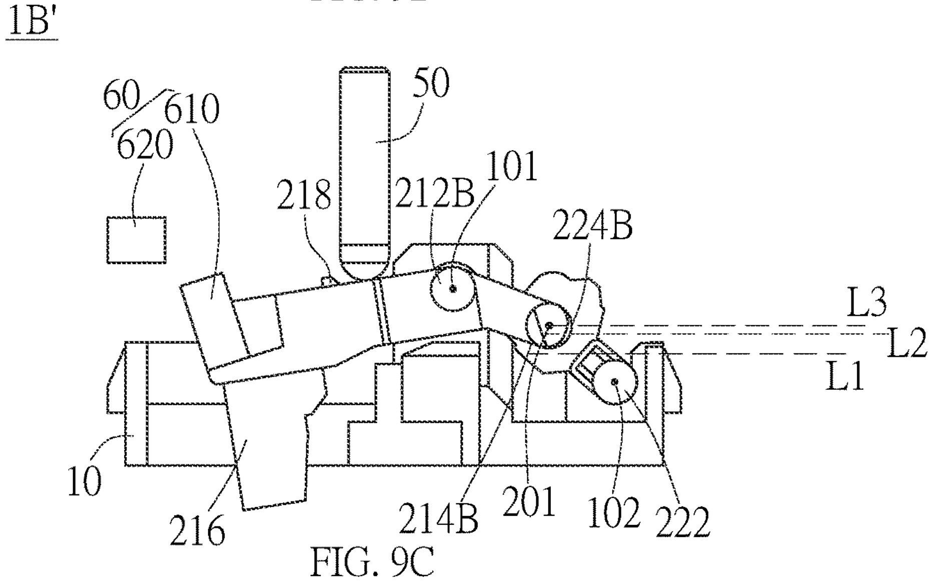

Referring to FIG. 9A to FIG. 9C, the operation of the key structure 1B' will be illustrated. FIG. 9A to FIG. 9C show that the key structure 1B' are in the non-pressed state, the transition state, and the pressing stop state, respectively. As shown in FIG. 9A, when the pressing force is not applied to the linkage mechanism 20B (e.g. the first linking member 210B), the linkage mechanism 20B supports the key structure 1B' in the non-pressed state by the force provided by the restoring member (e.g. the magnetic attraction force between the first magnetic member 610 and the second magnetic member 620). In other words, when the key structure 1B' is in the non-pressed state, the coupling axis 201 of the first linking member 210B and the second linking member 220B formed by coupling the first connecting portion 214B and the second connecting portion 224B is located at the non-pressed position L1. The operation member 50 is positioned by the positioning portion 218 of the first linking member 210B, and the actuating portion 216 of the first linking member 210B does not shield or partially shields the light channel 150, so the intensity of the optical signal received by the receiver 420 from the emitter 410 is stronger (i.e., the amount of light received is larger).

As shown in FIG. 9B and FIG. 9C, when the pressing force is applied to the first linking member 210B of the linkage mechanism 20B, the first linking member 210B drives the first magnetic member 610 to move away from the second magnetic member 620. Specifically, when the pressing force is applied to the first linking member 210B by the operation member 50, the first linking member 210B rotates about the first rotation axis 101 to enable the actuating portion 216 to rotate counterclockwise (i.e., along the first direction) toward the base 10, and the first magnetic member 610 moves downward with the first linking member 210B to be away from the second magnetic member 620. Meanwhile, the first connecting portion 214B of the first linking member 210B rotates counterclockwise away from the base 10 (i.e., the coupling axis 201 moves upward through the transition position L2 to the pressing stop position L3) and drives the second connecting portion 224B of the second linking member 220B to move upward, so the second linking member 220B is driven to rotate clockwise (i.e., along the second direction) about the second rotation axis 102. Moreover, the actuating portion 216 rotates with the first linking member 210B and moves to a position that the light channel 150 can be shielded, so the intensity of the optical signal received by the receiver 420 from the emitter 410 is smaller (i.e., the amount of light received is less) or substantially equal to zero (i.e., the receiver 420 does not receive the optical signal), and the switch unit 40 is triggered to generate the triggering signal.

When the pressing force is released, the magnetic attraction force between the first magnetic member 610 and the second magnetic member 620 enables the first linking member 210B and the first magnetic member 610 to move close to the second magnetic member 620 back to the position before being pressed (i.e., back to the non-pressed position). Specifically, when the pressing force is released, the magnetic attraction force between the first magnetic member 610 and the second magnetic member 620 enables the first magnetic member 610 to move (e.g. upward) toward the second magnetic member 620 and drives the first linking member 210B to rotate clockwise, and the first connecting portion 214B drives the second linking member 220B to rotate counterclockwise. As such, the key structure 1B' returns from the pressing stop state of FIG. 9C through the transition state of FIG. 9B to the non-pressed state of FIG. 9A.

The key structure 1B' utilizes the associated movements of the first linking member 210B and the second linking member 220B to restrict the rotation range of the first linking member 210B and the second linking member 220B relative to the base 10, thereby achieving a non-collision pressing stop point. In other words, the key structure 1B' can achieve the limiting effect without collision between components to effectively reduce abnormal sound. Moreover, the key structure 1B' utilizes the magnetic attraction force between the first magnetic member 610 and the second magnetic member 620 to provide a click feedback. In other words, the key structure 1B' can use the magnetic unit 60 as the restoring member not only to replace the torsion spring of FIG. 6A to drive the first linking member 210B with the second linking member 220B to return the non-pressed position, but also utilizes the magnetic attraction force provided by the magnetic unit 60 to enable the key structure 1B' to provide the click feedback, but not limited thereto. In other embodiments (e.g. the embodiment of FIG. 10A), the key structure can use the torsion spring as the restoring member 30 and uses the magnetic unit 60 to provide the click feedback. As such, the key structure can provide a non-collision silencing effect and a non-contact (e.g. magnetic attraction) click feedback.

Figure 10A:
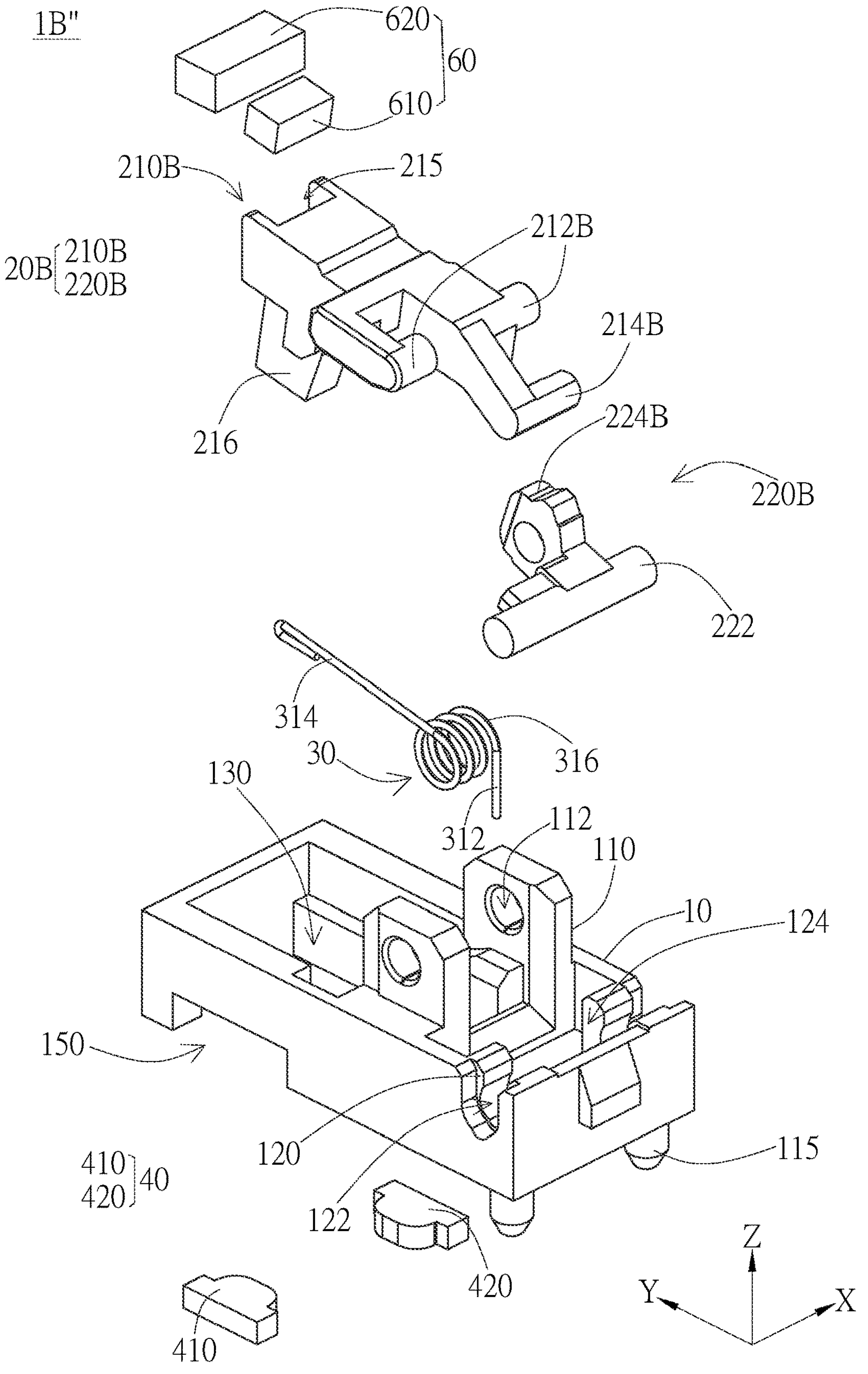
FIG. 10A to FIG. 10D are an exploded view, an assembled view, a bottom view, and a cross-sectional view of the key structure in a fifth embodiment of the invention, respectively.
Figure 10B:
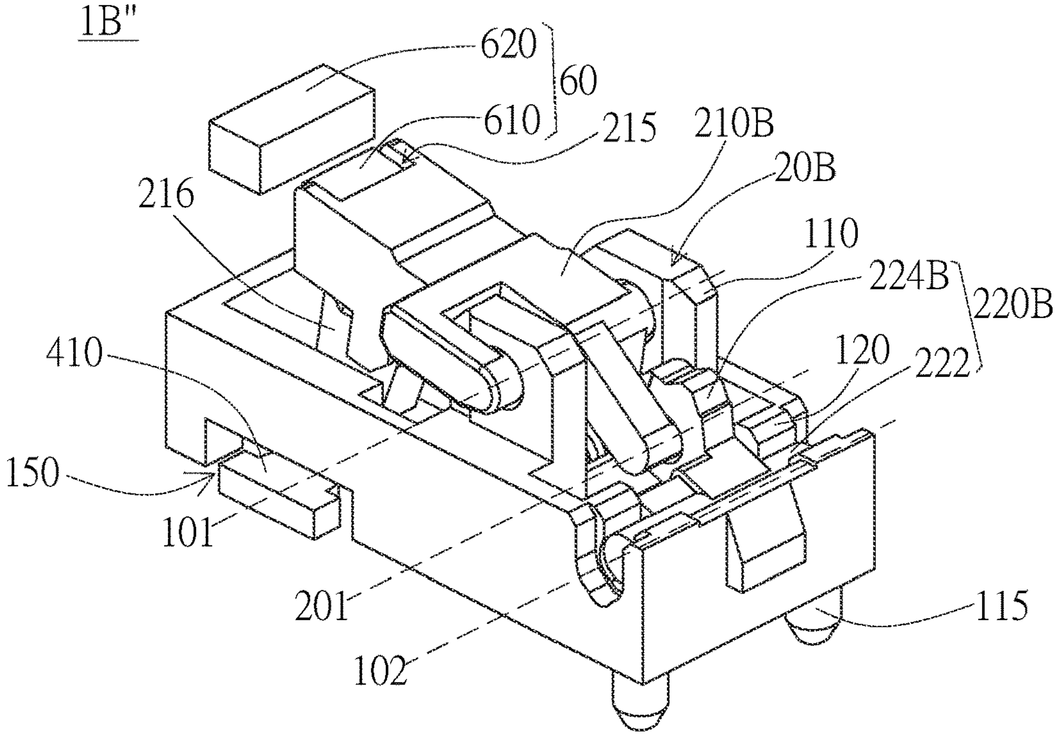
Figure 10C:
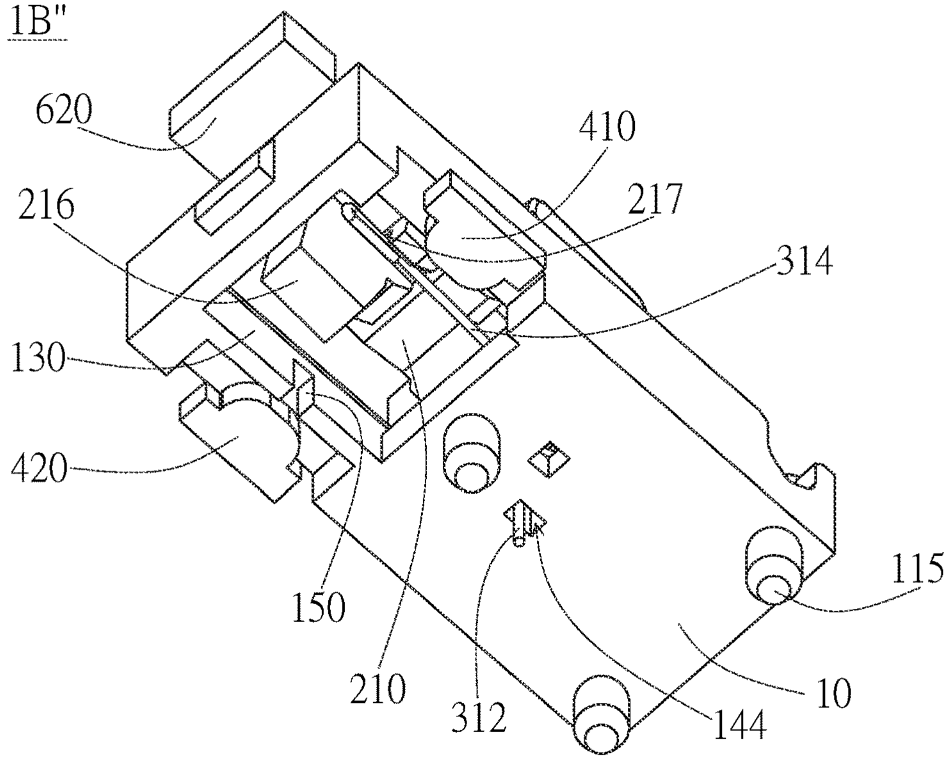
Figure 10D:
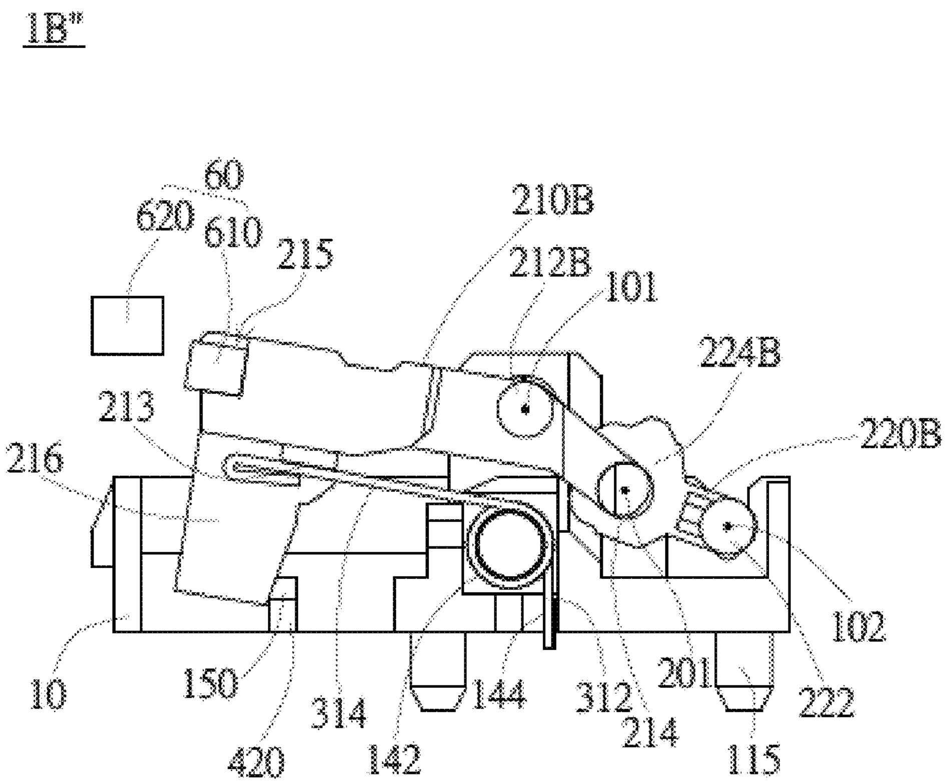

FIG. 10A to FIG. 10D are an exploded view, an assembled view, a bottom view, and a cross-sectional view of the key structure 1B" in a fifth embodiment of the invention, respectively. The key structure 1B" of FIG. 10A is a variant embodiment of the key structures 1B, 1B' of FIG. 6A and FIG. 8A, and the detailed structure and function of components of the key structure 1B" can be referred to the related descriptions of the previous embodiments and will not elaborate again. In this embodiment, the key structure 1B" includes not only the torsion spring type restoring member 30 similar to FIG. 6A, but also the magnetic unit 60 similar to FIG. 8A. Moreover, as shown in FIG. 10C and FIG. 10D, the first linking member 210B of the linkage mechanism 20B preferably has a positioning groove 217, which is adapted to position the acting portion 314 of the restoring member 30. In this embodiment, the positioning groove 217 can be disposed at the bottom of the first linking member 210B near the actuating portion 216. As such, the bottom of the positioning groove 217 can function as the lower surface 213 of the first linking member 210B, which is in contact with the acting portion 314. When the restoring member 30 is disposed on the base 10, the spring body 316 is accommodated in the accommodation space 142, and the positioning portion 312 is inserted into the positioning hole 144 of the base 10, so the acting portion 314 is at least partially inserted into the positioning groove 217 and against the lower surface 213 to enhance the coupling effect of the acting portion 314 of the restoring member 30 and the first linking member 210B, but not limited thereto. In this embodiment, the base 10 may further include a positioning mechanism 115 to facilitate the positioning of the key structure 1B" on other component (e.g. the circuit board or the support component). For example, the positioning mechanism 115 can be implemented as a post protruding from the bottom of the base 10, but not limited thereto. In other embodiments, the positioning mechanism 115 can be implemented as a hole or a groove on the bottom of the base 10.

In this embodiment, the operation of the key structure 1B" is similar to those of FIGS. 7A and 7B or those of FIG. 9A to FIG. 9C. As shown in FIG. 10D, when the pressing force is not applied to the linkage mechanism 20B (e.g. the first linking member 210B), the linkage mechanism 20B supports the key structure 1B" in the non-pressed state by the restoring force provided by the restoring member 30 and the magnetic attraction force between the first magnetic member 610 and the second magnetic member 620. When the key structure 1B" is in the non-pressed state, the actuating portion 216 of the first linking member 210B does not shield or partially shields the light channel 150, so the intensity of the optical signal received by the receiver 420 from the emitter 410 is stronger (i.e., the amount of light received is larger). When the pressing force is applied to the first linking member 210B of the linkage mechanism 20B, the first linking member 210B rotates about the first rotation axis 101 along the first direction (e.g. counterclockwise). The first linking member 210B drives the first magnetic member 610 to move away from the second magnetic member 620, and the first linking member 210B pushes the acting portion 314 of the restoring member 30 by the lower surface 213, so the acting portion 314 is elastically deformed with respect to the positioning portion 312. Meanwhile, the first connecting portion 214B of the first linking member 210B also rotates counterclockwise away from the base 10 (i.e., the coupling axis 201 moves upward to the pressing stop position) and drives the second connecting portion 224B of the second linking member 220B to move upward, so the second linking member 220B is driven to rotate about the second rotation axis 102 along the second direction (e.g. clockwise). Through the linkage of the first linking member 210B and the second linking member 220B, the rotation range of the first linking member 210B and the second linking member 220B relative to the base 10 can be restrained. In other words, once the coupling axis 201 reaches the pressing stop position, the coupling axis 201 can no longer move upward. Moreover, the actuating portion 216 rotates with the first linking member 210B to a position that the light channel 150 can be shielded. As such, the intensity of the optical signal received by the receiver 420 from the emitter 410 is smaller (e.g. the amount of light received is less) or substantially equal to zero (i.e., the receiver 420 does not receive the optical signal), and the switch unit 40 is triggered to generate the triggering signal.

When the pressing force is released, the restoring force provided by the restoring member 30 and the magnetic attraction force between the first magnetic member 610 and the second magnetic member 620 enable the acting portion 314 to push the lower surface 213 of the first linking member 210B upward and drive the first linking member 210B to rotate clockwise. As such, the first connecting portion 214B drives the second linking member 220B to rotate counterclockwise, and the first linking member 210B drives the first magnetic member 610 to move close to the second magnetic member 620, making the key structure 1B" return to the non-pressed state. Specifically, the key structure 1B" not only utilizes the displacement limitation of the first linking member 210B and the second linking member 220B to achieve the pressing stop point without collision of components, but also utilizes the magnetic attraction force provided by the magnetic unit 60 to make the key structure 1B" have the silent click feedback, so that the abnormal sound caused by collision of components can be reduced.

Figure 11A:
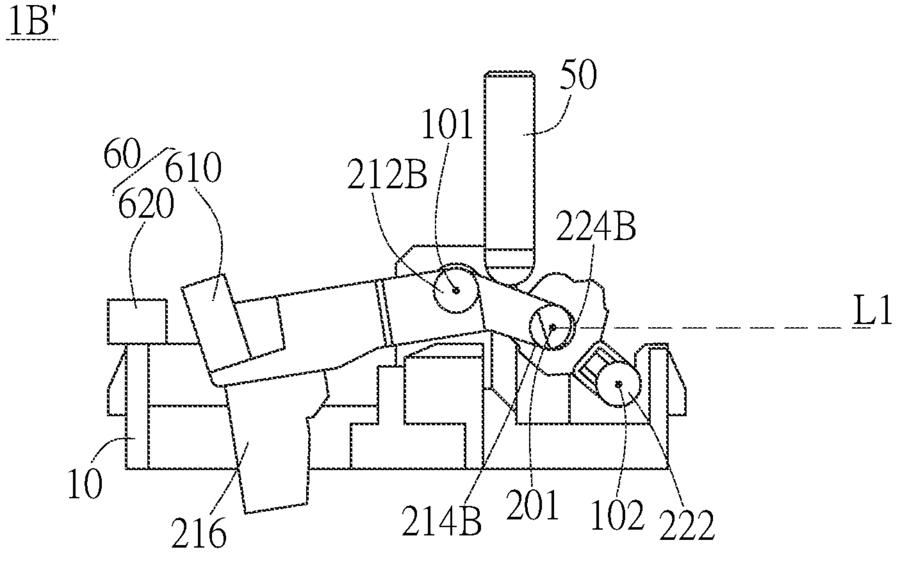
Figure 11B:
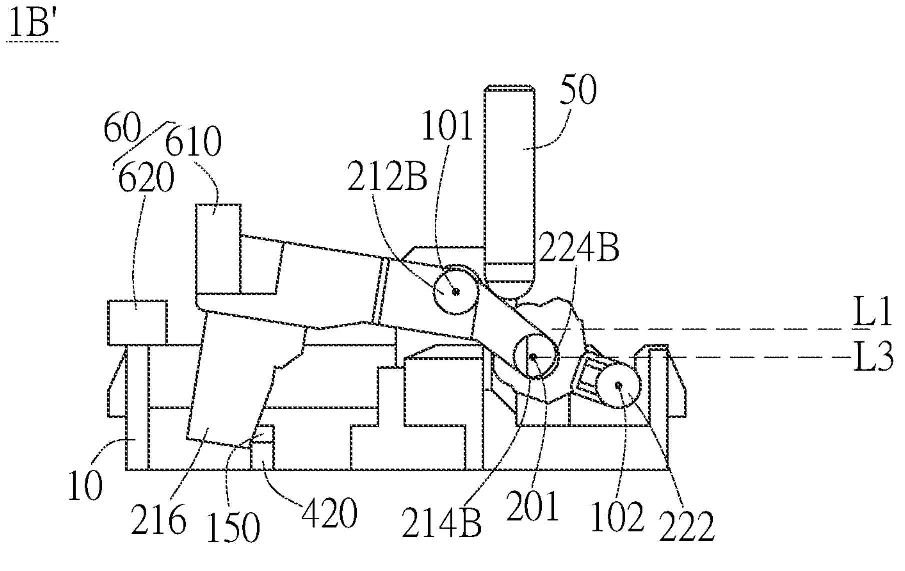

In the previous embodiments, the operation of the key structure 1, 1A, 1B, 1B', or 1B" is illustrated by using the operation member 50 to apply the pressing force on the side of the first linking member 210, 210A, or 210B opposite to the first connecting portion 214, 214A, or 214B with respect to the first rotation axis 101, so the coupling axis 201 moves away from the base 10 after the pressing force is applied, but not limited thereto. As shown in FIG. 11A and FIG. 11B, FIG. 11A and FIG. 11B are schematic views of a variant embodiment of the operation of the key structure 1B' of FIG. 8A. In this embodiment, the pressing force is applied to the same side of the first linking member 210B as the first connecting portion 214B with respect to the first rotation axis 101, so the coupling axis 201 moves toward the base 10 when the pressing force is applied. Specifically, as shown in FIG. 11A, when the pressing force is not applied to the first linking member 210B, the linkage mechanism supports the key structure 1B' in the non-pressed state by the magnetic attraction force between the first magnetic member 610 and the second magnetic member 620. In other words, the coupling axis 201 is located at the non-pressed position L1, and the actuating portion 216 of the first linking member 210B at least partially shields the light channel 150, so the intensity of the optical signal received by the receiver 420 from the emitter 410 is smaller (i.e., the amount of light received is less) or substantially equal to zero (i.e., the receiver 420 does not receive the optical signal). As shown in FIG. 11B, when the pressing force is applied to the righthand side of the first linking member 210B (i.e., the same side as the first connecting portion 214B with respect to the first rotation axis 101) by the operation member 50, the first linking member 210B rotates about the first rotation axis 101 along the first direction (e.g. clockwise) to drive the actuating portion 216 to rotate clockwise (also along the first direction) away from the base 10, and the first magnetic member 610 moves upward with the first linking member 210B away from the second magnetic member 620. Meanwhile, the first connecting portion 214B of the first linking member 210B rotates clockwise toward the base 10 (i.e., the coupling axis 201 moves downward to the pressing stop position L3) and drives the second connecting portion 224B of the second linking member 220B to move downward, so the second linking member 220B is driven to rotate about the second rotation axis 102 along the second direction (e.g. counterclockwise). Moreover, the actuating portion 216 rotates with the first linking member 210B and moves to a position to open the light channel 150, so the intensity of the optical signal received by the receiver 420 from the emitter 410 is stronger (e.g. the amount of light received is larger), and the switch unit is triggered to generate the triggering signal.

Figure 12B:
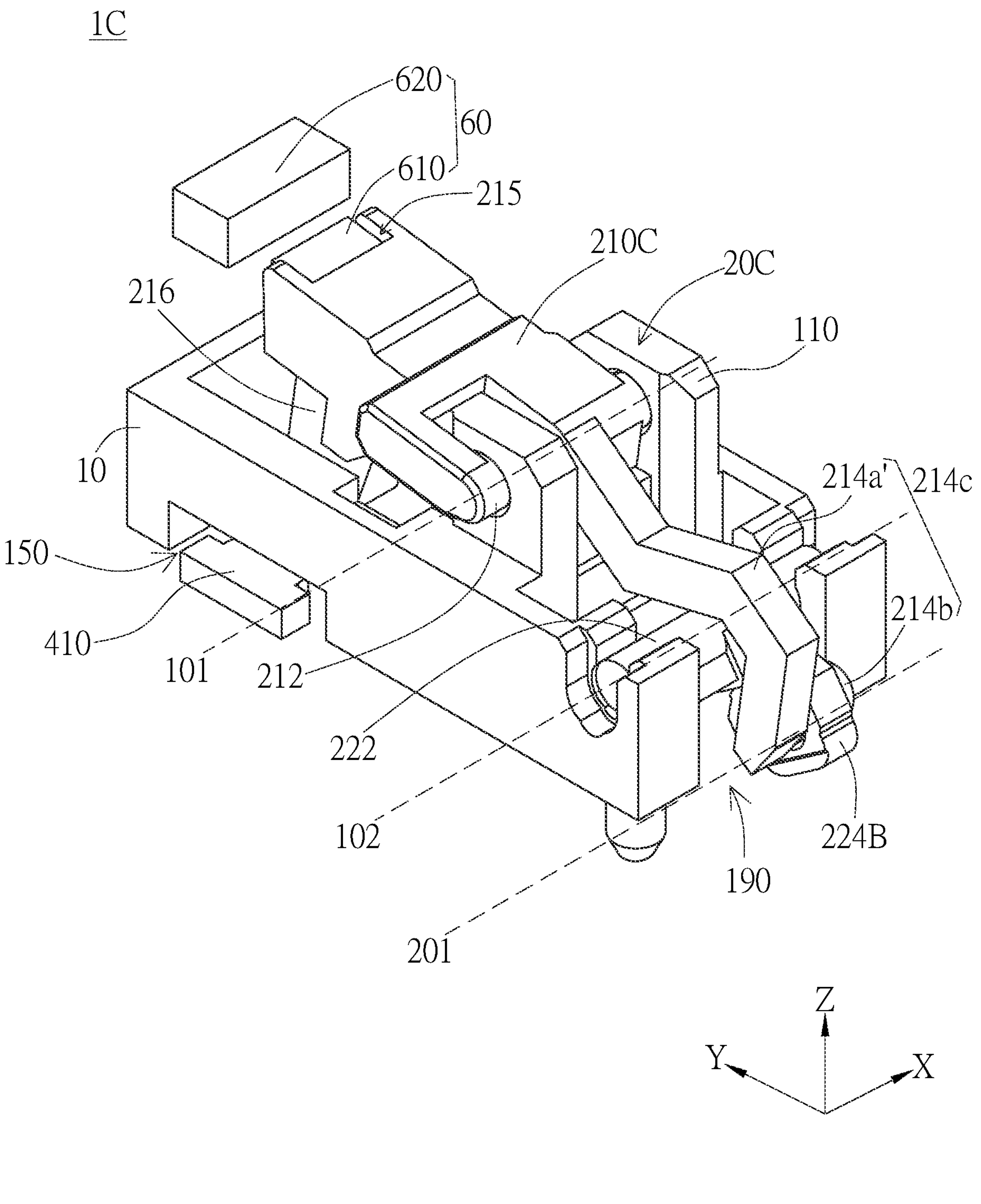

FIG. 12A and FIG. 12B are an exploded view and an assembled view of the key structure 1C of a sixth embodiment of the invention. In this embodiment, by modifying the design of the linkage mechanism, the coupling axis can be located not between the two rotation axes. For example, as shown in FIG. 12A and FIG. 12B, the key structure 1C includes a linkage mechanism 20C and the base 10. The key structure 1C and the key structure 1B' are different in that the first linking member 210C of the linkage mechanism 20C has a first connecting portion 214C, so the coupling position of the first linking member 210C and the second linking member 220B are changed. The structure and function of other components of the key structure 1C can be referred to the related descriptions of the previous embodiments and will not elaborate again. Specifically, the first connecting portion 214C of the first linking member 210C includes a first connection section **214*a*', which extends from the first pivoting portion 212. The first connection section 214*a*' preferably extends by a length beyond the second coupling portion 120 of the base 10, and a pivot 214*b* is formed at the end of the first connection section 214*a* and extends along the X-axis direction. When the linkage mechanism 20C is disposed on the base 10, the first pivoting portion 212 of the first linking member 210C couples with the first coupling portion 110 of the base 10 to form the first rotation axis 101. The second pivoting portion 222 of the second linking member 220B couples with the second coupling portion 120 of the base 10 to form the second rotation axis 102. The first connecting portion 214C of the first linking member 210C extends across the second rotation axis 102 to couple with the second connecting portion 224B of the second linking member 220B to form the coupling axis 201. As such, the coupling axis 201 is located at the outer side of the first rotation axis 101 and the second rotation axis 102. In other words, the first rotation axis 101, the second rotation axis 102, and the coupling axis 201 are disposed sequentially along the Y-axis direction. In response to the modification of the first linking member 210C, the base 10 further has an action space 190, which allows the linkage mechanism 20C (e.g. the second linking member 220B) to move therein. For example, the action space 190 can be formed as an opening of the base 10, which corresponds to the coupling axis 201, so an open space communicating with the outside is formed between the two pivotal holes 122 of the second coupling portion 120**, but not limited thereto.

Figure 13A:
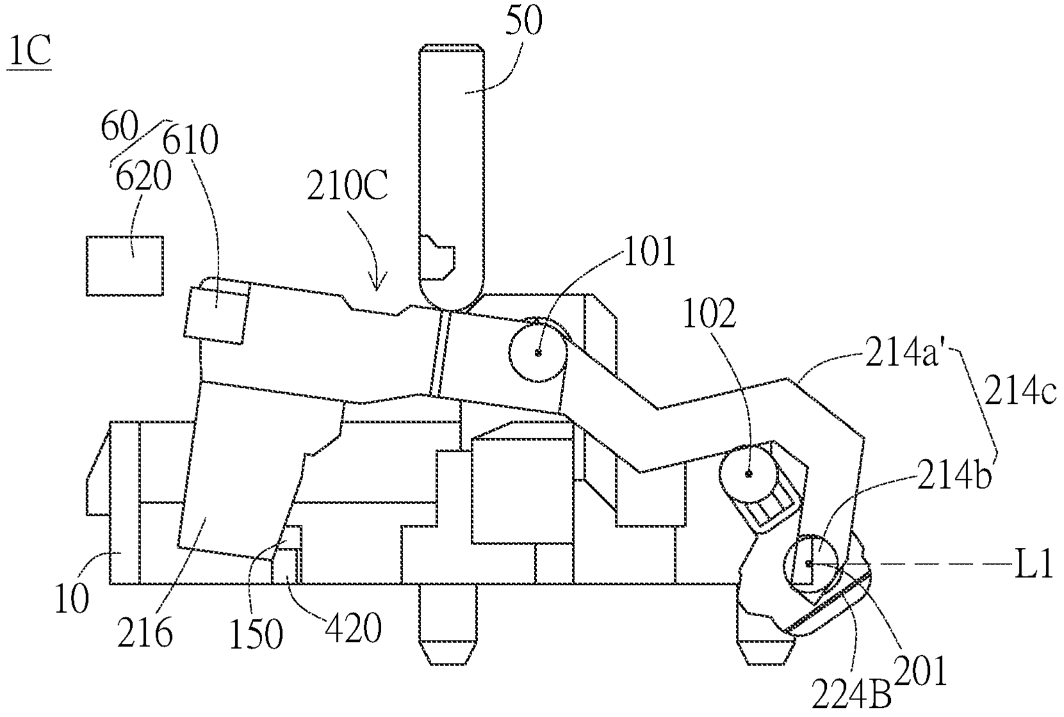
Figure 13B:
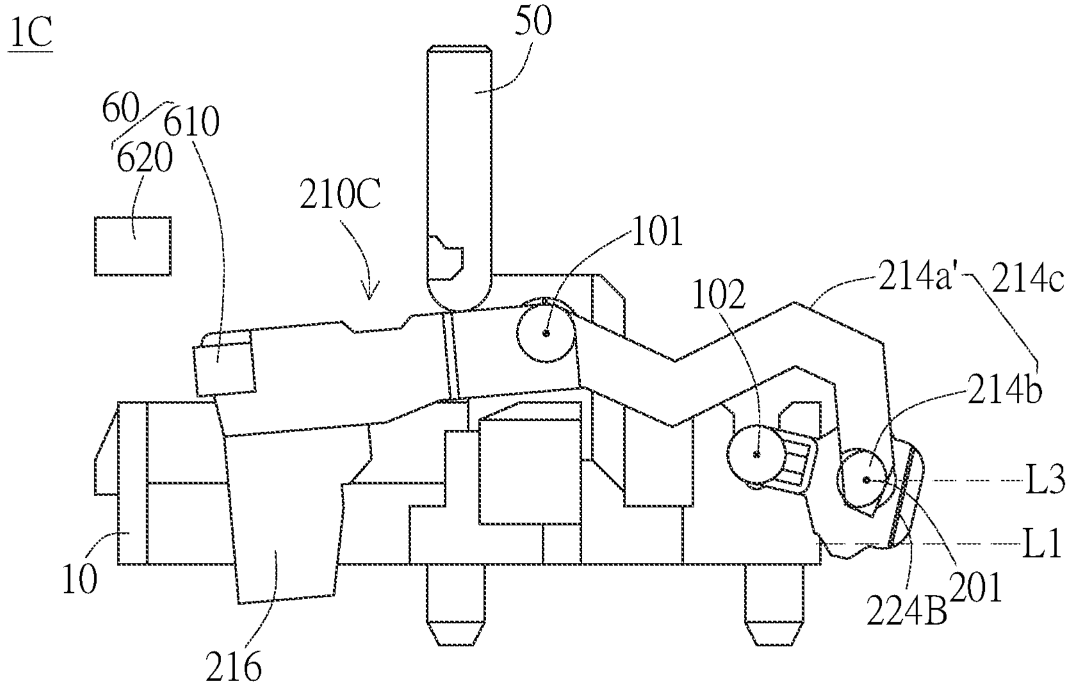

Referring to FIG. 13A and FIG. 13B, the operation of the key structure 1C is illustrated. FIG. 13A and FIG. 13B show that the key structure 1C is in the non-pressed state and the pressing stop state, respectively. As shown in FIG. 13A, when the pressing force is not applied to the linkage mechanism 20C (e.g. the first linking member 210C), the linkage mechanism 20C supports the key structure 1C in the non-pressed state by the magnetic attraction force between the first magnetic member 610 and the second magnetic member 620. When the key structure 1C is in the non-pressed state, the coupling axis 201 of the first linking member 210C and the second linking member 220B formed by coupling the first connecting portion 214C and the second connecting portion 224B is located at the non-pressed position L1, and the actuating portion 216 of the first linking member 210C does not shield or partially shields the light channel 150, so the intensity of the optical signal received by the receiver 420 from the emitter 410 is stronger (i.e., the amount of light received is larger).

As shown in FIG. 13B, when the pressing force is applied to the first linking member 210C by the operation member 50, the first linking member 210C rotates about the first rotation axis 101 to enable the actuating portion 216 to rotate counterclockwise (i.e., along the first direction) toward the base 10, and the first magnetic member 610 moves downward with the first linking member 210C away from the second magnetic member 620. Meanwhile, the first connecting portion 214C of the first linking member 210C also rotates counterclockwise away from the base 10 (i.e., the coupling axis 201 moves upward to the pressing stop position L3) and drives the second connecting portion 224B of the second linking member 220B to move upward, so the second linking member 220B is driven to rotate about the second rotation axis 102 along the second direction (e.g. counterclockwise) in the action space 190. In other words, by modifying the coupling design of the plurality of linking members, the first linking member 210C can drive the second linking member 220B to rotate along the same direction (i.e., the first direction and the second direction are the same direction). Moreover, the actuating portion 216 rotates with the first linking member 210C and moves to a position that the light channel 150 can be shielded, so the intensity of the optical signal received by the receiver 420 from the emitter 410 is smaller (e.g. the amount of light received is less) or substantially equal to zero (i.e., the receiver 420 does not receive the optical signal), and the switch unit 40 is triggered to generate the triggering signal.

Figure 14:
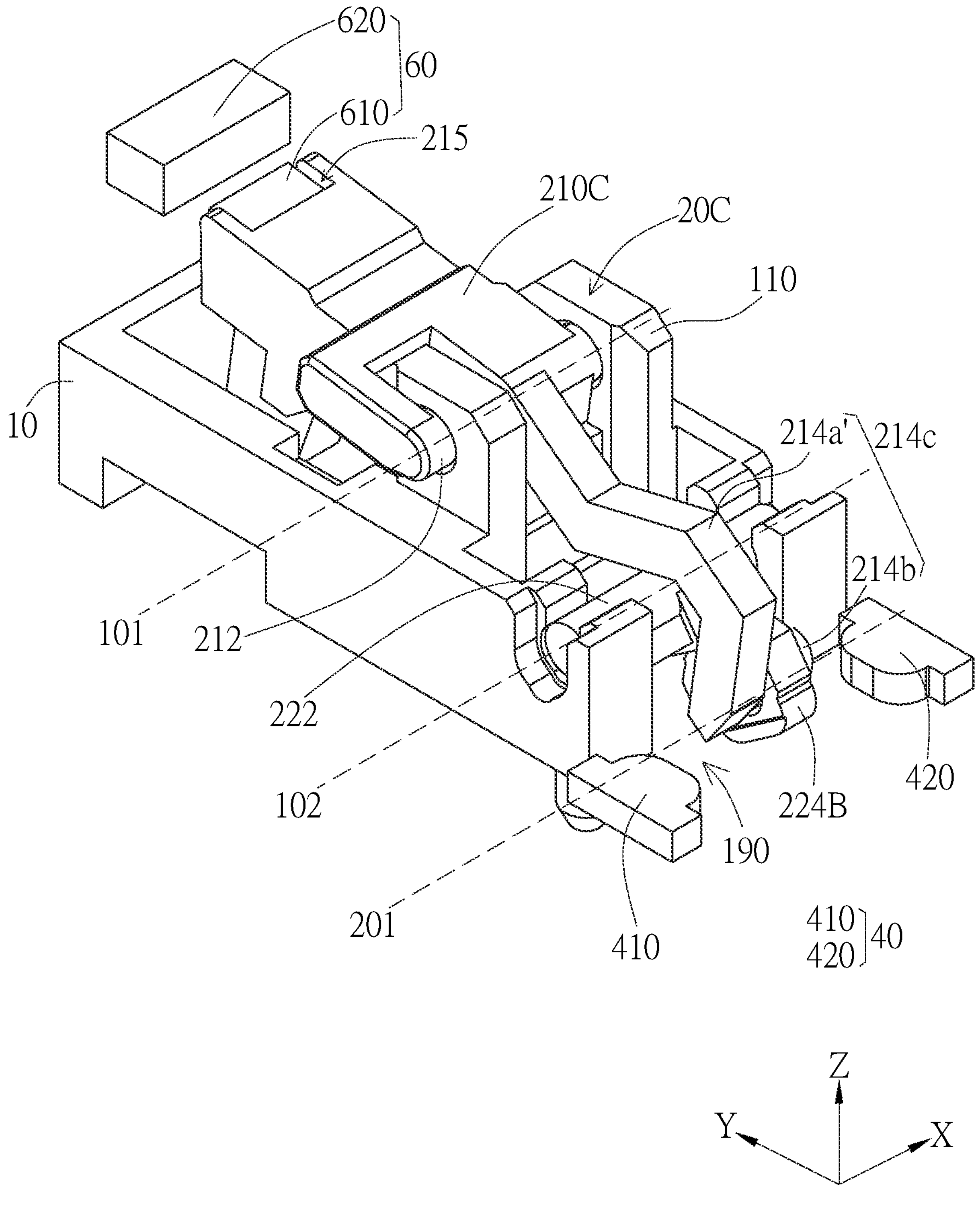
FIG. 14 is a schematic view of a variant embodiment of the key structure of FIG. 12B.
Figure 15A:
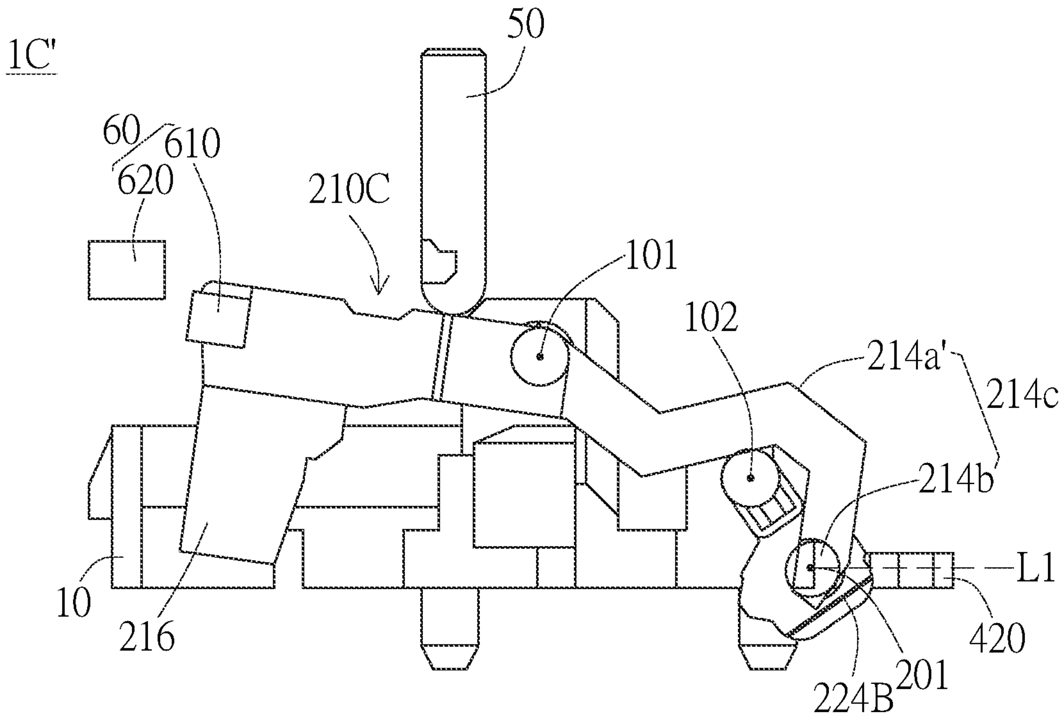
Figure 15B:
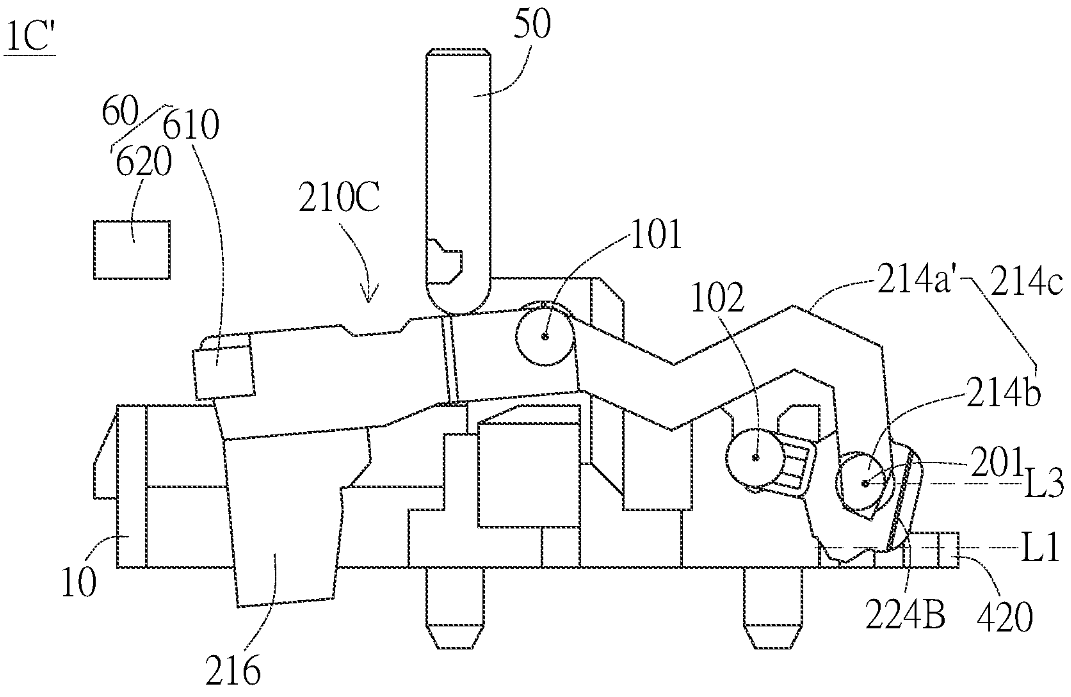

FIG. 14 is a schematic view of a variant embodiment of the key structure 1C of FIG. 12B. In this embodiment, the position of the switch unit 40 of the key structure 1C' is different from that of the key structure 1C, so the switch unit 40 can be triggered by the second linking member 220B. Specifically, in this embodiment, the emitter 410 and the receiver 420 of the switch unit 40 are disposed corresponding to the second linking member 220B at one side of the base 10, such as a position corresponding to the coupling axis 201, so that the switch unit 40 can be triggered by the second linking member 220B. Referring to FIG. 15A and FIG. 15B, the operation of the key structure 1C' is illustrated. FIG. 15A and FIG. 15B show that the key structure 1C' is in the non-pressed state and the pressing stop state, respectively. As shown in FIG. 15A, when the pressing force is not applied to the linkage mechanism 20C (e.g. the first linking member 210C), the linkage mechanism 20C supports the key structure 1C' in the non-pressed state by the magnetic attraction force between the first magnetic member 610 and the second magnetic member 620. When the key structure 1C' is in the non-pressed state, the coupling axis 201 of the first linking member 210C and the second linking member 220B formed by coupling the first connecting portion 214C and second connecting portion 224B is located at the non-pressed position L1. The second linking member 220B (e.g., the second connecting portion 224B) is located at a position that the optical signal is not shielded or partially shielded, so the intensity of the optical signal received by the receiver 420 from the emitter 410 is stronger (e.g. the amount of light received is larger).

As shown in FIG. 15B, when the pressing force is applied to the first linking member 210C by the operation member 50, the first linking member 210C rotates about the first rotation axis 101 to enable the actuating portion 216 (which can be omitted in this embodiment) to rotate counterclockwise toward the base 10, and the first magnetic member 610 moves downward with the first linking member 210C away from the second magnetic member 620. Meanwhile, the first connecting portion 214C of the first linking member 210C also rotates counterclockwise away from the base 10 (i.e., the coupling axis 201 moves upward to the pressing stop position L3) and drives the second connecting portion 224B of the second linking member 220B to move upward, so the second linking member 220B is driven to rotate about the second rotation axis 102 counterclockwise in the action space 190 to a position that the optical signal can be shielded. As such, the intensity of the optical signal received by the receiver 420 from the emitter 410 is smaller (e.g. the amount of light received is less) or substantially equal to zero (i.e., the receiver 420 does not receive the optical signal), and the switch unit 40 is triggered to generate the triggering signal.

Figure 16A:
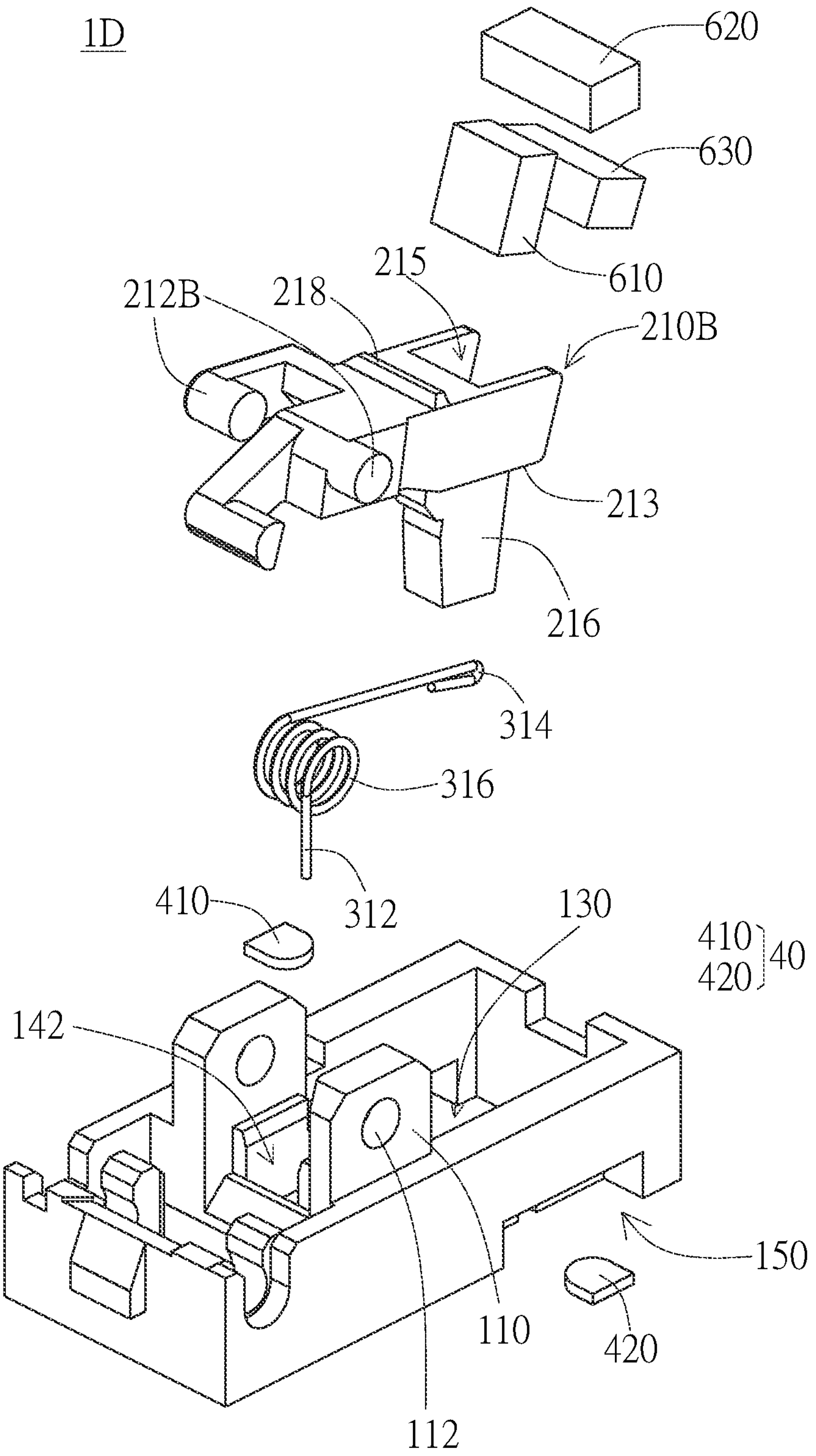
FIG. 16A and FIG. 16B are an exploded view and an assembled view of the key structure in a seventh embodiment of the invention.
Figure 16B:
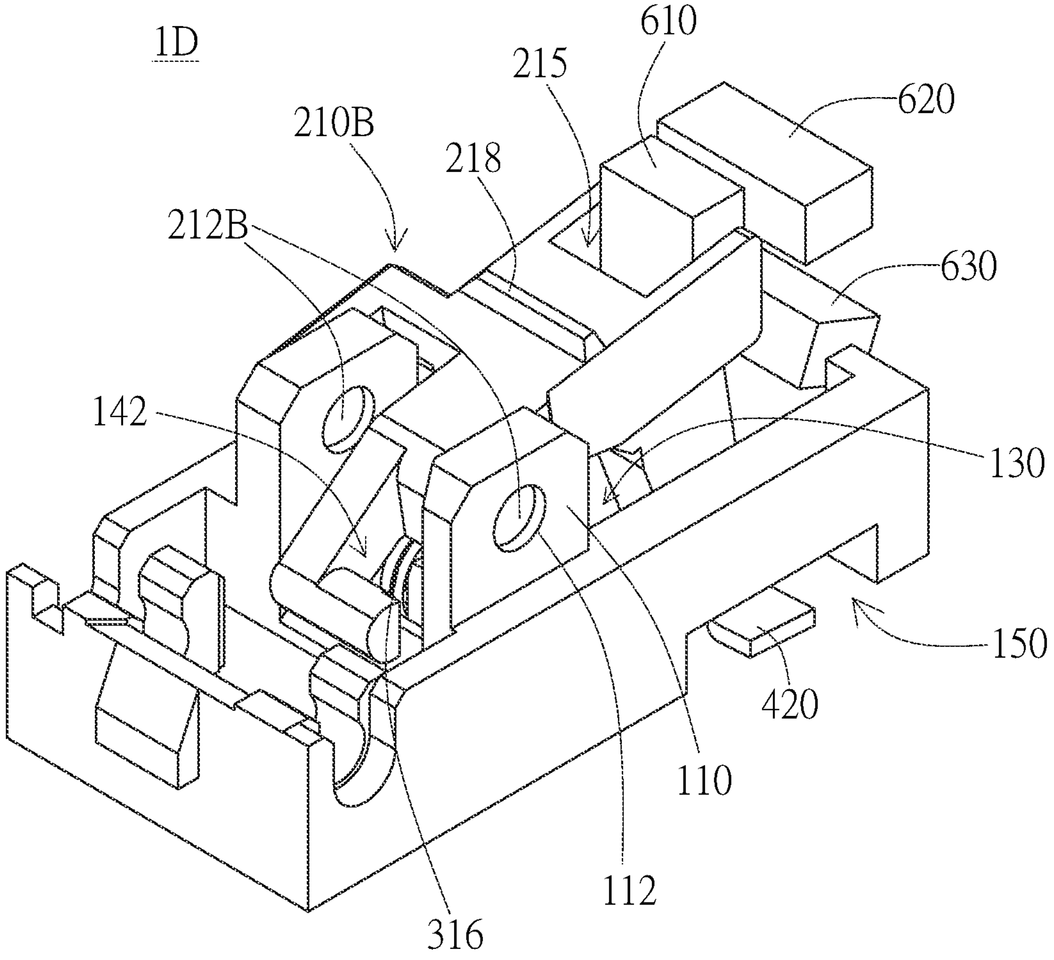

FIG. 16A and FIG. 16B are an exploded view and an assembled view of the key structure 1D in a seventh embodiment of the invention. In this embodiment, the key structure 1D includes the base 10, a movable member (such as the first linking member 210B), and the magnetic unit 60. The movable member is rotatably disposed on the base 10. The magnetic unit 60 includes the first magnetic member 610 and the second magnetic member 620. The first magnetic member 610 is disposed on the movable member, and the second magnetic member 620 is disposed corresponding to the first magnetic member 610 to generate a magnetic attraction force. When a pressing force is applied to the movable member, the movable member drives the first magnetic member 610 to move away from the second magnetic member 620. When the pressing force is released, the magnetic attraction force between the first magnetic member 610 and the second magnetic member 620 enables the movable member to move with the first magnetic member 610 toward the second magnetic member 620 to a position before the pressing force is applied.

Specifically, the key structure 1D of FIG. 16A is a variant embodiment of the key structures 1B, 1B', 1B" of FIG. 6A, FIG. 8A and FIG. 10A. The key structure 1D includes a torsion spring type restoring member 30 similar to those of FIG. 6A and FIG. 10A and the magnetic unit 60 similar to those of FIG. 8A and FIG. 10A. In this embodiment, the key structure 1D can include only the first linking member 2106 as the movable member, and the second linking member 2206 of FIG. 6A, FIG. 8A, or FIG. 10A can be omitted. The magnetic unit 60 can further include a third magnetic member 630. In this embodiment, the first magnetic member 610, the second magnetic member 620, and the third magnetic member 630 of the magnetic unit 60 can be implemented as all magnets or a combination of the magnet and the ferromagnetic material, so the first magnetic member 610 can produce the magnetic attraction force respectively with the second magnetic member 620 and the third magnetic member 630. The third magnetic member 630 and the second magnetic member 620 are disposed along the moving path of the movable member (i.e., the first linking member 210B). When the pressing force is applied to the movable member, the movable member drives the first magnetic member 610 to move away from the second magnetic member 620 and close to the third magnetic member 630. Specifically, the second magnetic member 620 and the third magnetic member 630 can be disposed along the Z-axis direction, and the magnetic attraction force can be generated between the third magnetic member 630 and the first magnetic member 610.

Figure 17A:
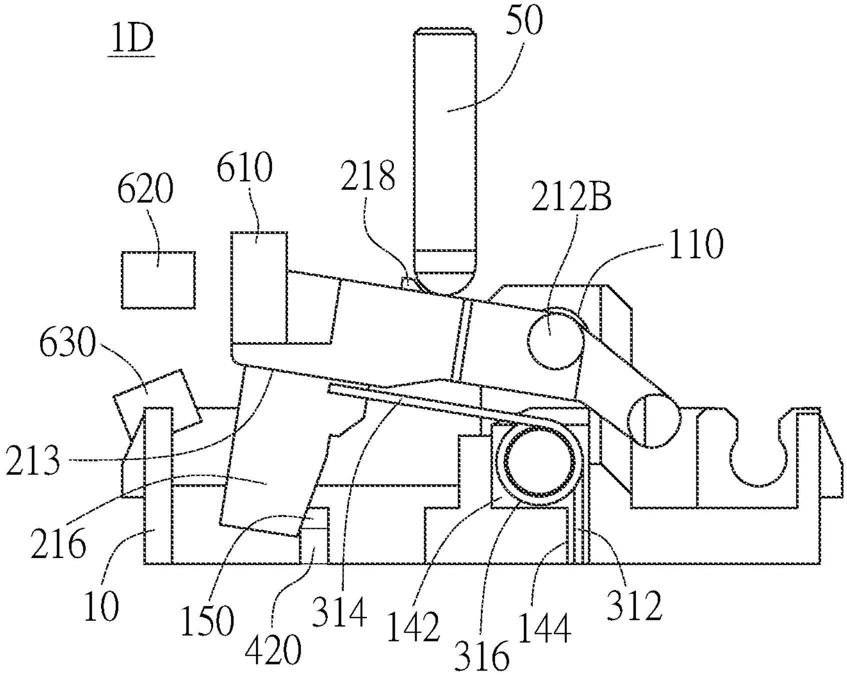
Figure 17B:
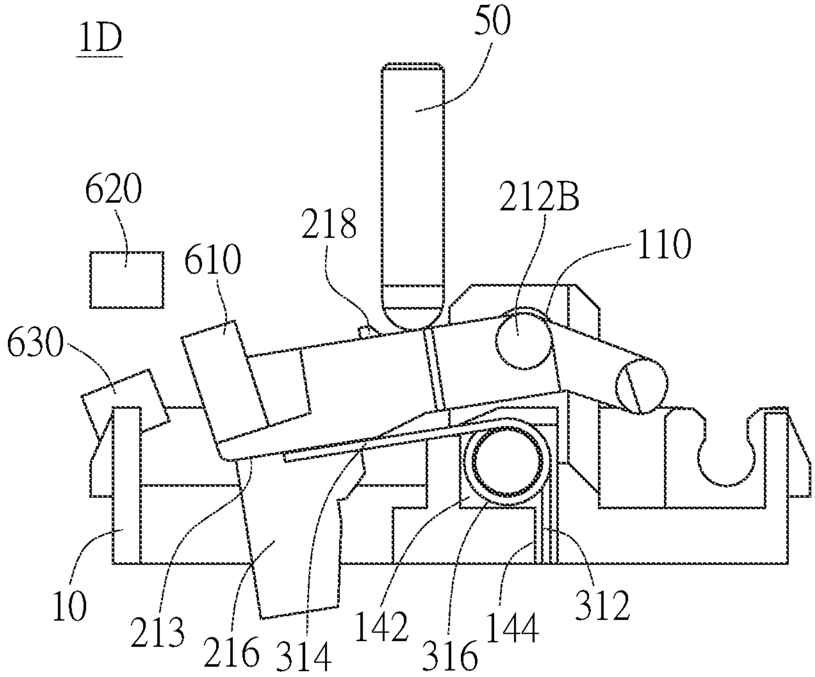

Referring to FIG. 17A and FIG. 17B, the operation of the key structure 1D is illustrated. FIG. 17A and FIG. 17B show that the key structure 1D is in the non-pressed state and the pressing stop state, respectively. As shown in FIG. 17A, when the pressing force is not applied to the movable member (e.g. the first linking member 210B), the linkage mechanism 20B supports the key structure 1D in the non-pressed by the restoring force provided by the restoring member 30 and the magnetic attraction force between the first magnetic member 610 and the second magnetic member 620. When the key structure 1D is in the non-pressed state, the operation member 50 is positioned by the positioning portion 218 of the first linking member 210B, and the actuating portion 216 of the first linking member 210B does not shield or partially shields the light channel 150, so the intensity of the optical signal received by the receiver 420 from the emitter 410 is stronger (i.e., the amount of light received is larger).

As shown in FIG. 17B, when the pressing force is applied to the first linking member 210B, the first linking member 210B drives the first magnetic member 610 to move away from the second magnetic member 620 and close to the third magnetic member 630. Specifically, when the pressing force is applied to the first linking member 210B by the operation member 50, the first linking member 210B rotates about the first rotation axis 101 along the first direction (e.g. counter-clockwise), and the lower surface 213 of the first linking member 210 pushes the acting portion 314 of the restoring member 30 downward, so the acting portion 314 moves relative to the positioning portion 312, and the acting portion 314 is elastically deformed with respect to the positioning portion 312. Meanwhile, the first magnetic member 610 moves downward with the first linking member 210B away from the second magnetic member 620 and close to the third magnetic member 630, so the pressing stop point of the key structure 1D can be defined by the magnetic attraction force between the third magnetic member 630 and the first magnetic member 610. Moreover, the actuating portion 216 rotates with the first linking member 210B to a position that the light channel 150 can be partially or fully shielded, so the intensity of the optical signal received by the receiver 420 from the emitter 410 is smaller (i.e., the amount of light received is less) or substantially equal to zero (i.e., the receiver 420 does not receive the optical signal), and the switch unit 40 is triggered to generate the triggering signal.

When the pressing force is released, the restoring force provided by the restoring member 30 enables the acting portion 314 to push the lower surface 213 of the first linking member 210 to drive the first linking member 210 to rotate clockwise, so the first magnetic member 610 moves upward away from the third magnetic member 630 and close to the second magnetic member 620, and the key structure 1D returns from the pressing stop point (or the pressed state) of FIG. 17B to the non-pressed state of FIG. 17A (i.e., the position before the pressing force is applied). Specifically, the key structure 1D utilizes the magnetic attraction force between the first magnetic member 610 and the second magnetic member 620 to position the first linking member 210B in the non-pressed position.

The key structure 1D utilizes the first magnetic member 610 of the magnetic unit 60 to selectively generate the magnetic attraction force with the second magnetic member 620 or with the third magnetic member 630 to be positioned in the non-pressed state or in the pressed state, so the key structure 1D can achieve the limiting effect without collision between components to effectively reduce the abnormal sound. Moreover, the key structure 1D can provide the click feedback by the magnetic attraction force generated between the first magnetic member 610 and the second magnetic member 620 or the magnetic attraction force generated between the first magnetic member 610 and the third magnetic member 630. In other words, the key structure 1D can not only use the magnetic unit 60 as the displacement limiting mechanism, but also use the magnetic attraction forces provided by the magnetic unit 60 to provide the silent click feedback, so the key structure 1D can provide a non-collision silencing effect and a non-contact (magnetic) click feedback.

As shown in FIG. 18A to FIG. 19B, in the above embodiments, the key structure 1, 1A, 1B, 1B', 1B'', 1C, or 1D can further include a cover 70, which is combined with the base 10 to form a housing. Specifically, the cover 70 preferably has a shape corresponding to the base 10, such as a rectangular cap. The cover 70 and the base 10 can be combined with each other by any suitable engaging mechanism. For example, the base 10 has hook-like portions 160 on two opposite sides in the Y-axis direction, and the cover 70 has corresponding holes 710. By engaging the hook-like portions 160 with the holes 710, the cover 70 and the base 10 can be combined to form the housing, which is adapted to protect components disposed therein. Moreover, the cover 70 and the base 10 may have an alignment mechanism, so the cover 70 can be easily and accurately combined with the base 10. For example, the cover 70 can have a protrusion 740, and the base 10 has a corresponding recess 170, so the cover 70 and the base 10 can be easily aligned by aligning the protrusion 740 with the recess 170. It is noted that the locations of the engaging mechanism (e.g. the hook-like portion and the hole) and the alignment mechanism (e.g. the protrusion and the recess) of the cover 70 and the base 10 can be interchanged, not limited to the embodiment.

The cover 70 further has an operation hole 730, and the operation member 50 is allowed to move relative to the cover 70 in the operation hole 730. The operation member 50 preferably has a restricting portion 52, which is configured to prevent the operation member 50 from escaping from the cover 70 when the operation member 50 moves in the operation hole 730. For example, the restricting portion 52 can be two wings disposed at two sides of the lower end of the operation member 50, and the distance between the two wings is preferably larger than the corresponding width of the operation hole 730. As such, when the operation member 50 inserted into the operation hole 730 from the bottom of the cover 70 moves upward, the restricting portion 52 can interfere with the cover 70 to prevent the operation member 50 from escaping the cover 70 from the upper side. Corresponding to the magnetic unit 60, the cover 70 can have an opening 720, so the second magnetic member 620 (and the third magnetic member 630) can correspond to the first magnetic member 610 through the opening 720. For example, the second magnetic member 620 (and the third magnetic member 630) can correspond to the opening 720 of the cover 70 (in which the first magnetic member 610 is disposed) or the neighborhood of the opening 720.

In the above embodiments, the key structure of the invention can utilize the linkage mechanism or the magnetic unit to provide the non-collision displacement limitation so as to reduce the abnormal sound caused by collision of the components. Moreover, the key structure of the invention can use the linkage mechanism or the magnetic unit to generate the click feedback so as to provide a silent tactile feedback and a satisfied operation experience.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A key structure, comprising:

a base; and a linkage mechanism comprising a first linking member and a second linking member movably connected to each other to form a coupling axis, the first linking member and the second linking member rotatably positioned on the base, respectively, wherein the first linking member has a first pivoting portion; the first linking member couples with the base through the first pivoting portion to form a first rotation axis; the second linking member has a second pivoting portion; the second linking member couples with the base through the second pivoting portion to form a second rotation axis, wherein when a pressing force is applied to the linkage mechanism, the first linking member rotates about the first rotation axis along a first direction to drive the coupling axis to move relative to the base, so the second linking member is driven to rotate about the second rotation axis along a second direction, the first direction and the second direction are a same direction or different directions, and a rotation range of the first linking member and the second linking member with respect to the base is restricted due to interference between moving paths of the first linking member and the second linking member.

2. The key structure of claim 1, wherein the first linking member has a first connecting portion connected to the first pivoting portion and located at one side of the first linking member; the second linking member has a second connecting portion connected to the second pivoting portion and located at one side of the second linking member; the first connecting portion and the second connecting portion couple with each other to form the coupling axis.

3. The key structure of claim 2, wherein the first connecting portion comprises two first connection sections disposed at two opposite ends of the first pivoting portion along the first rotation axis; the second connecting portion comprises two second connection sections disposed at two opposite ends of the second pivoting portion along the second rotation axis to couple with the two first connection sections, respectively; when the first linking member drives the second linking member to move, at least one of the first connection section and the second connection section elastically deforms.

4. The key structure of claim 2, wherein the second linking member further has a tactile feedback portion connected to the second pivoting portion and movably coupling the first pivoting portion; when the first linking member drives the second linking member to move, the tactile feedback portion moves relative to the first pivoting portion.

5. The key structure of claim 4, wherein the tactile feedback portion has a protrusion disposed corresponding to the first pivoting portion; when the tactile feedback portion moves relative to the first pivoting portion, the protrusion interferes with the first pivoting portion.

6. The key structure of claim 5, wherein the tactile feedback portion is formed with a groove; the protrusion is disposed at one side of the groove corresponding to the first pivoting portion; when the tactile feedback portion moves relative to the first pivoting portion, the first pivoting portion moves from one end of the groove to the other end of the groove and interacts with the protrusion during movement.

7. The key structure of claim 1, further comprising a restoring member disposed on the base, wherein when the pressing force is released, the restoring member provides a restoring force to enable the linkage mechanism to return to a non-pressed position.

8. The key structure of claim 7, wherein the restoring member comprises a resilient member; the resilient member comprises a positioning portion positioned on the base and an acting portion extending corresponding to the first linking member; when the pressing force is applied to the linkage mechanism, the first linking member pushes the acting portion to move relative to the positioning portion.

9. The key structure of claim 1, further comprising a magnetic unit, wherein the magnetic unit comprises a first magnetic member disposed on the linkage mechanism and a second magnetic member disposed corresponding to the first magnetic member to generate a magnetic attraction force; when the pressing force is applied to the linkage mechanism, the linkage mechanism drives the first magnetic member to move away from the second magnetic member; when the pressing force is released, the magnetic attraction force enables the linkage mechanism to move with the first magnetic member toward the second magnetic member to a position before the pressing force is applied.

10. The key structure of claim 7, further comprising a magnetic unit, wherein the magnetic unit comprises a first magnetic member disposed on the linkage mechanism and a second magnetic member disposed corresponding the first magnetic member to generate a magnetic attraction force; when the pressing force is applied to the linkage mechanism, the linkage mechanism drives the first magnetic member to move away from the second magnetic member; when the pressing force is released, the magnetic attraction force enables the linkage mechanism to move with the first magnetic member toward the second magnetic member to a position before the pressing force is applied.

11. The key structure of claim 8, further comprising a magnetic unit, wherein the magnetic unit comprises a first magnetic member disposed on the linkage mechanism and a second magnetic member corresponding the first magnetic member to generate a magnetic attraction force; when the pressing force is applied to the linkage mechanism, the linkage mechanism drives the first magnetic member to move away from the second magnetic member; when the pressing force is released, the magnetic attraction force enables the linkage mechanism to move with the first magnetic member toward the second magnetic member to a position before the pressing force is applied.

12. The key structure of claim 1, further comprising a switch unit disposed corresponding to the linkage mechanism, wherein when the pressing force is applied to the linkage mechanism, the linkage mechanism moves relative to the base to trigger the switch unit.

13. The key structure of claim 12, wherein the base has a light channel; the switch unit comprises an emitter and a receiver disposed at two ends of the light channel, respectively; when the linkage mechanism moves relative to the base, the linkage mechanism changes an intensity of an optical signal received by the receiver from the emitter to trigger the switch unit.

14. The key structure of claim 2, further comprising a switch unit disposed corresponding to the linkage mechanism, wherein when the pressing force is applied to the linkage mechanism, the linkage mechanism moves relative to the base to trigger the switch unit.

* * * * *